May 24, 1932. C. E. FULLER ET AL 1,860,143
HACKING MACHINE
Filed Oct. 24, 1929 23 Sheets-Sheet 1

Inventors
Claud E. Fuller
William W. Wallace
by James R. Hodde
Attorney

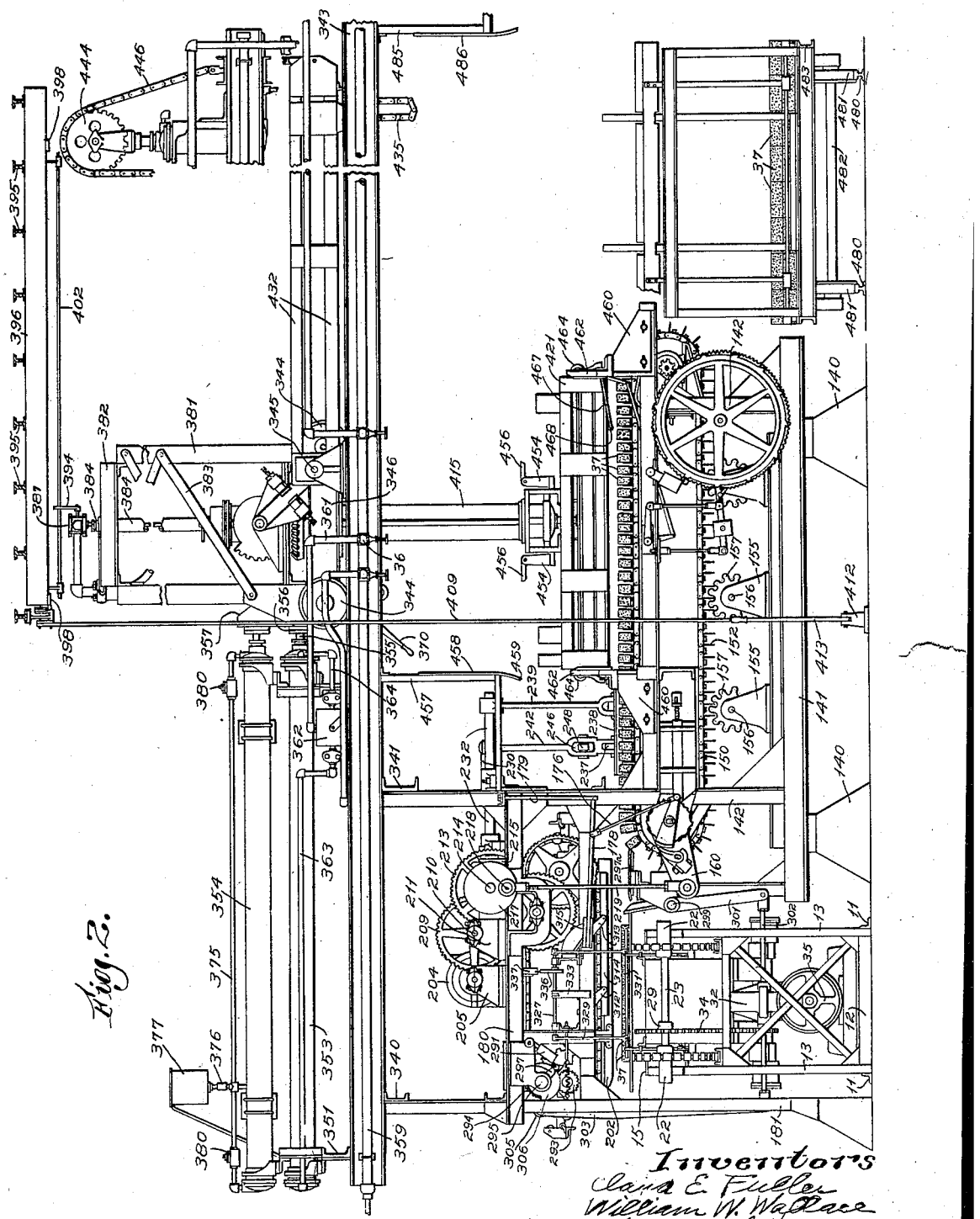

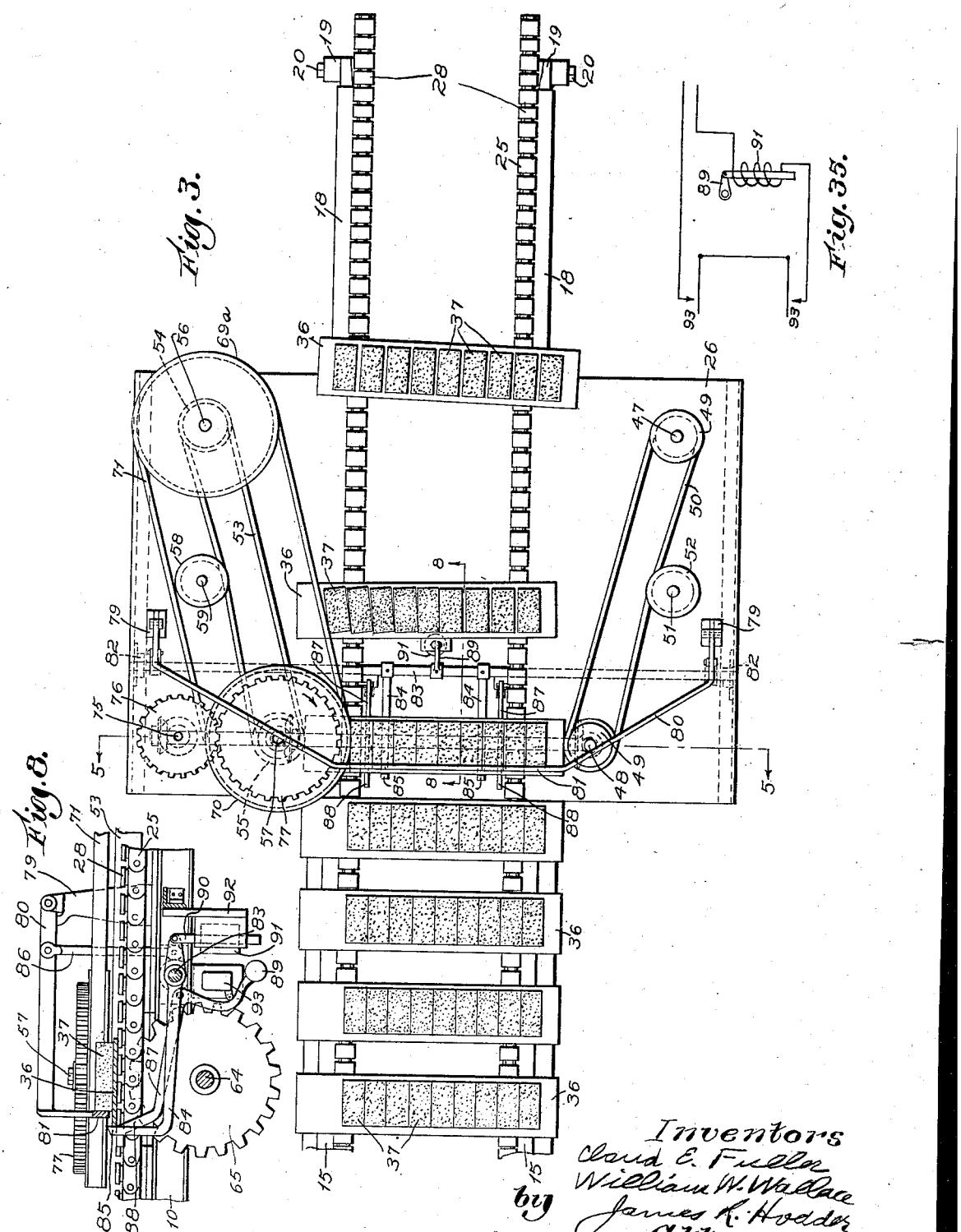

May 24, 1932. C. E. FULLER ET AL 1,860,143
HACKING MACHINE
Filed Oct. 24, 1929 23 Sheets-Sheet 4
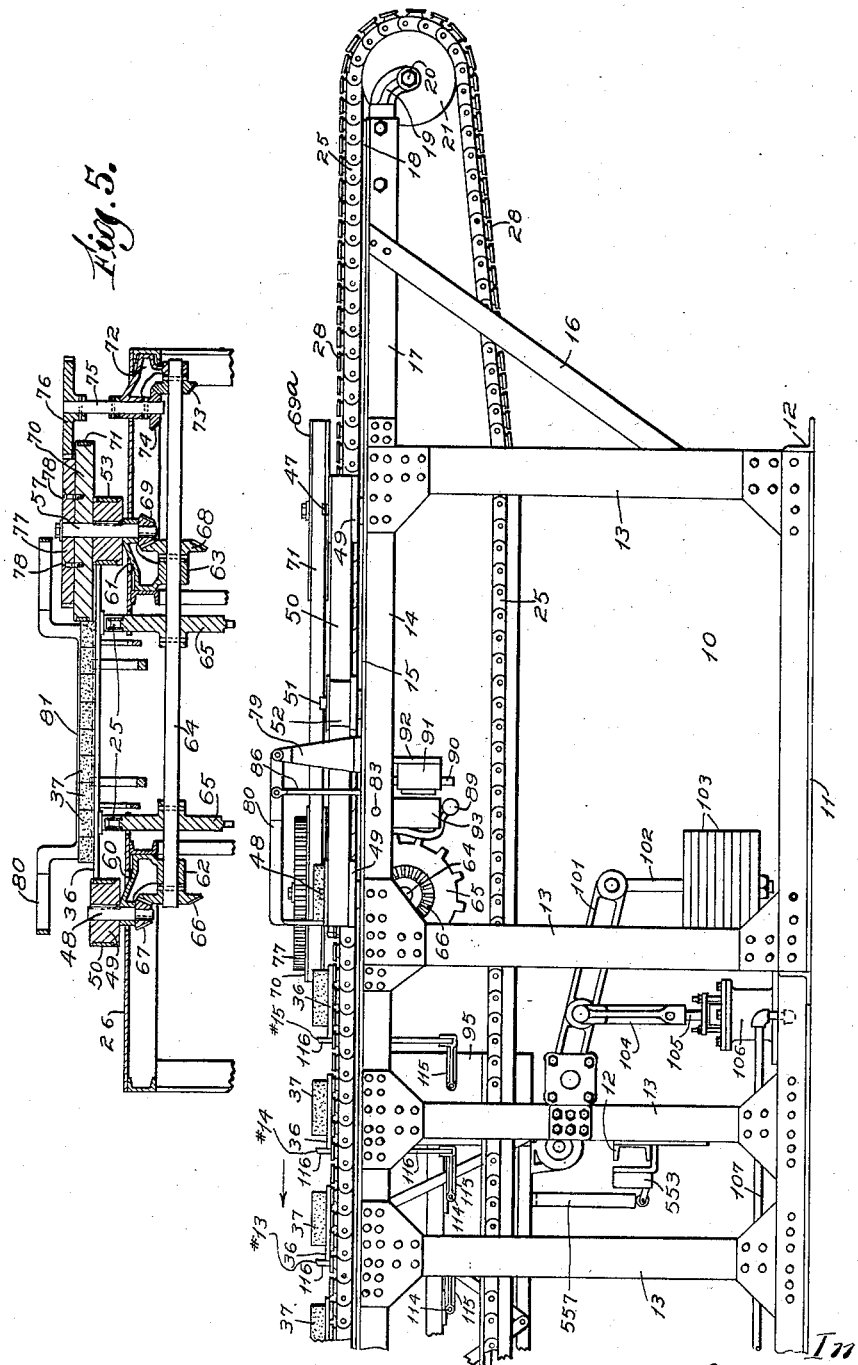
Inventors
Claud E. Fuller
William W. Wallace
by James R. Hodder
Attorney May 24, 1932. C. E. FULLER ET AL 1,860,143
HACKING MACHINE
Filed Oct. 24, 1929 23 Sheets-Sheet 5

Inventors
Claud E. Fuller
William W. Wallace
by James A. Hodder
Attorney

May 24, 1932.  C. E. FULLER ET AL  1,860,143
HACKING MACHINE
Filed Oct. 24, 1929  23 Sheets-Sheet 6

Inventors
Claud E. Fuller
William W. Wallace
by James R. Hodder
Attorney

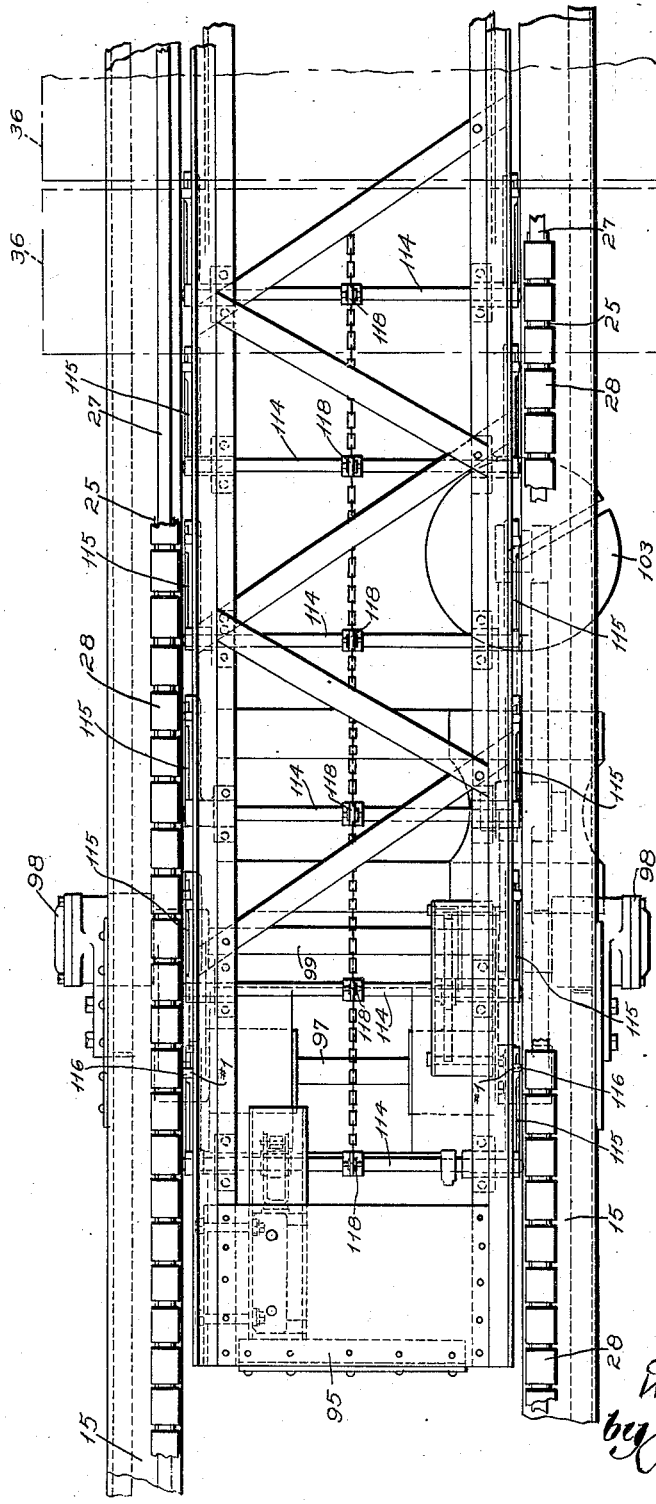

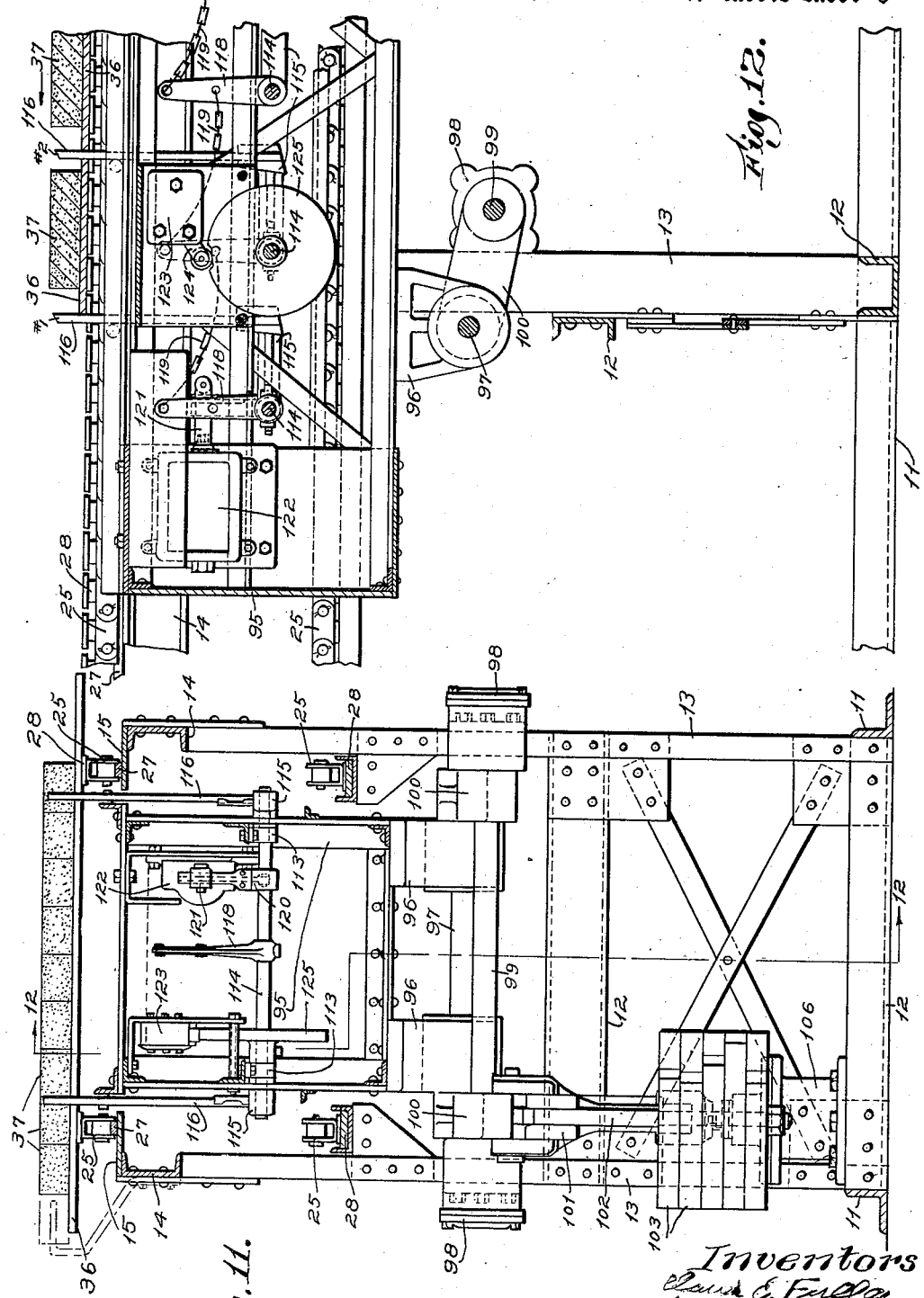

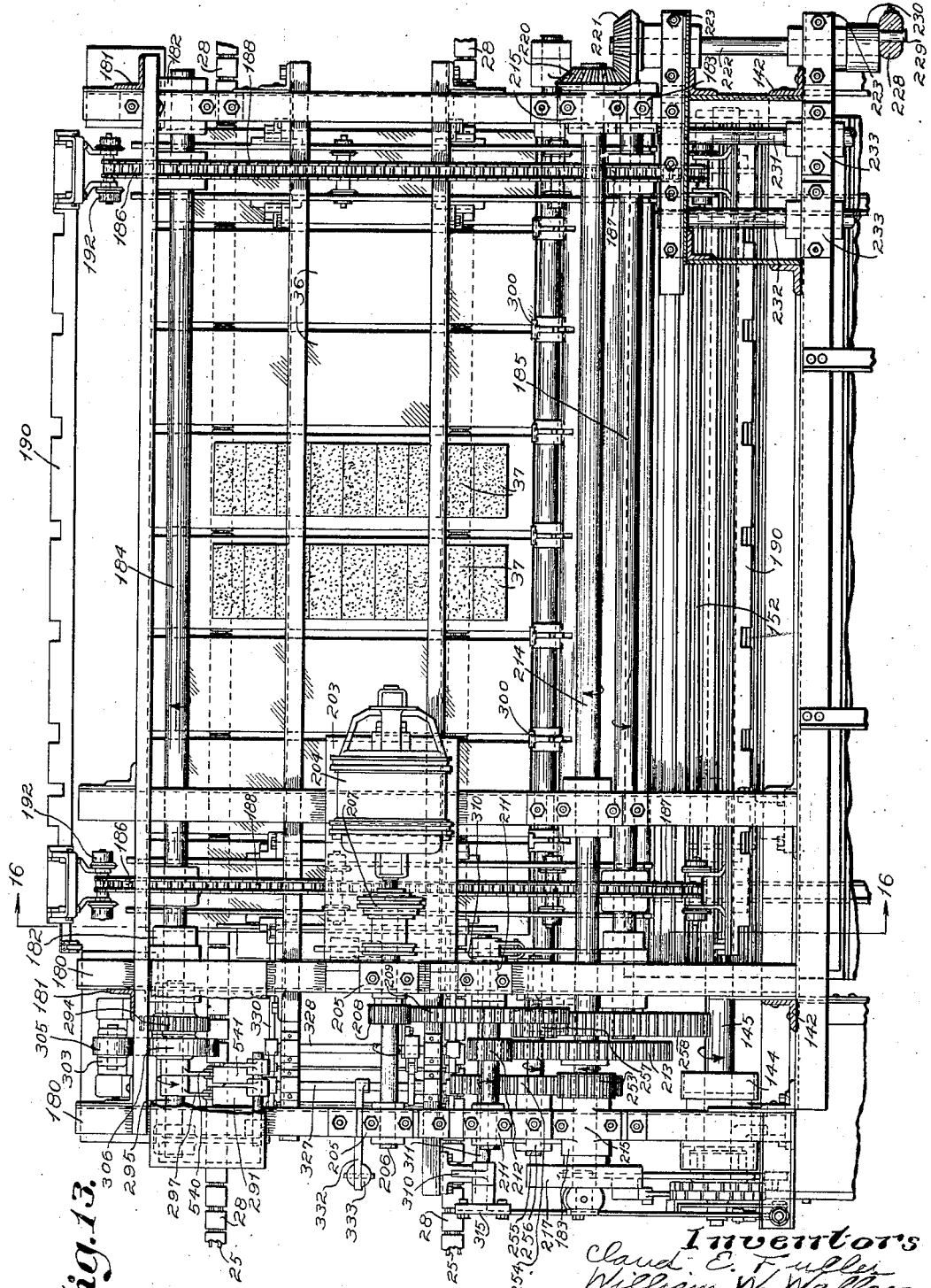

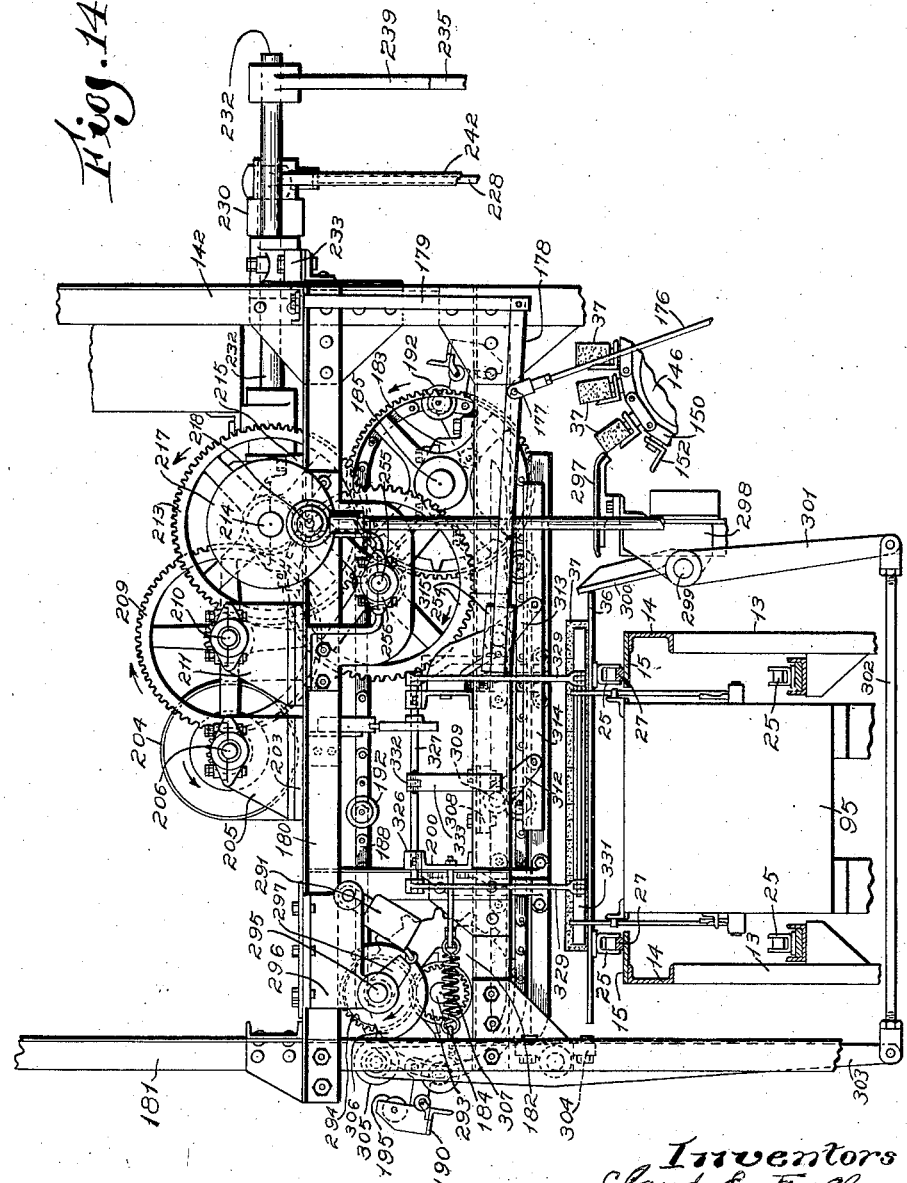

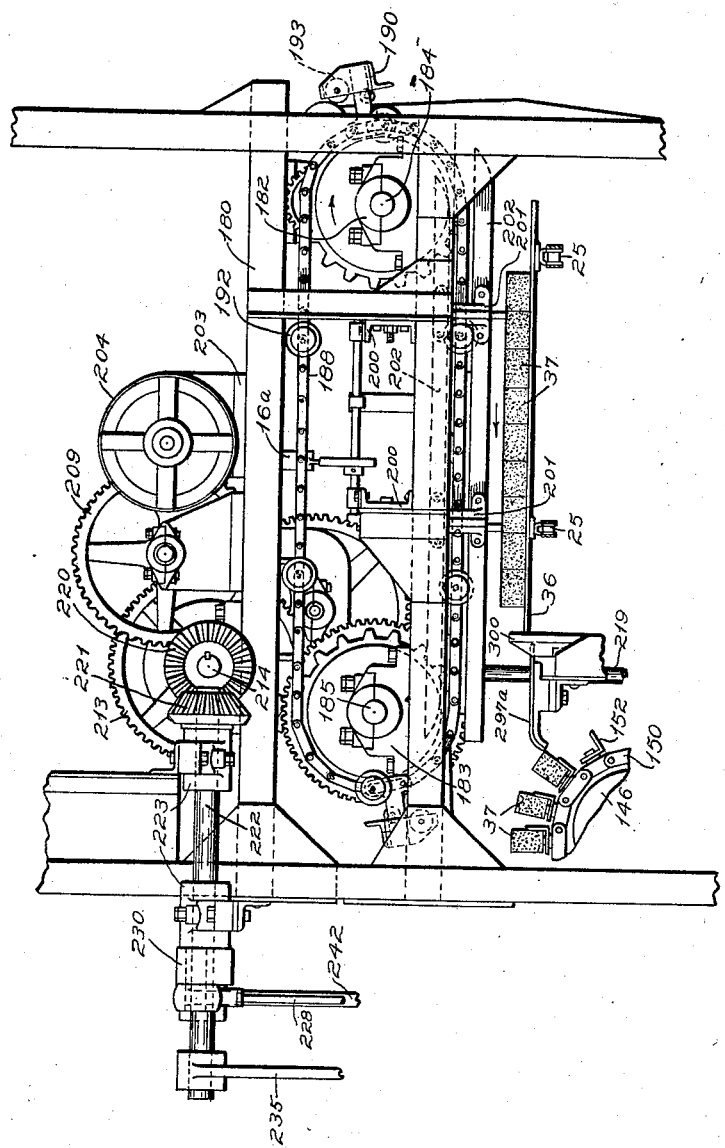

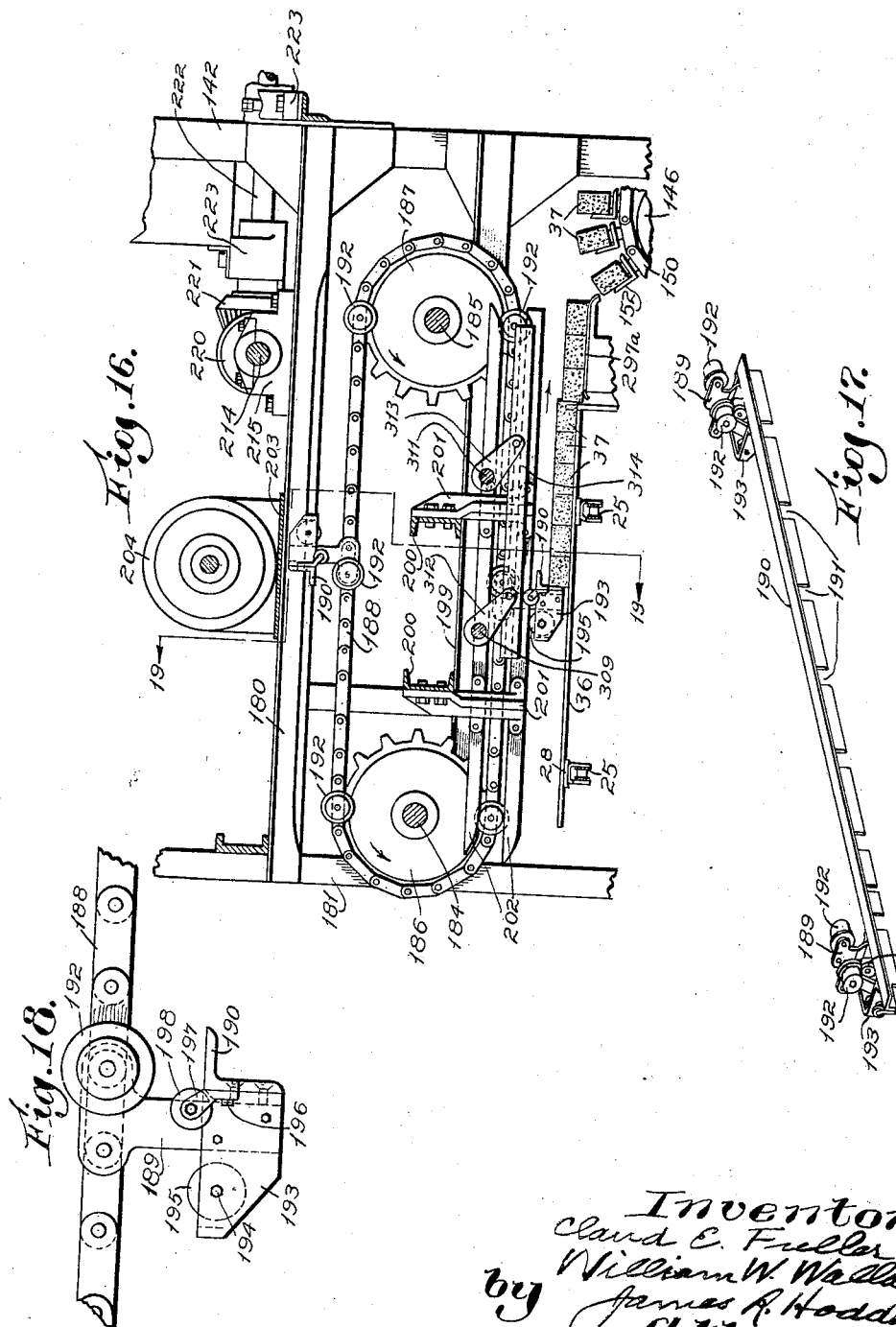

May 24, 1932. C. E. FULLER ET AL 1,860,143
HACKING MACHINE
Filed Oct. 24, 1929 23 Sheets-Sheet 13

Inventors
Claud E. Fuller
William M. Wallace
by James R. Hodder
Attorney

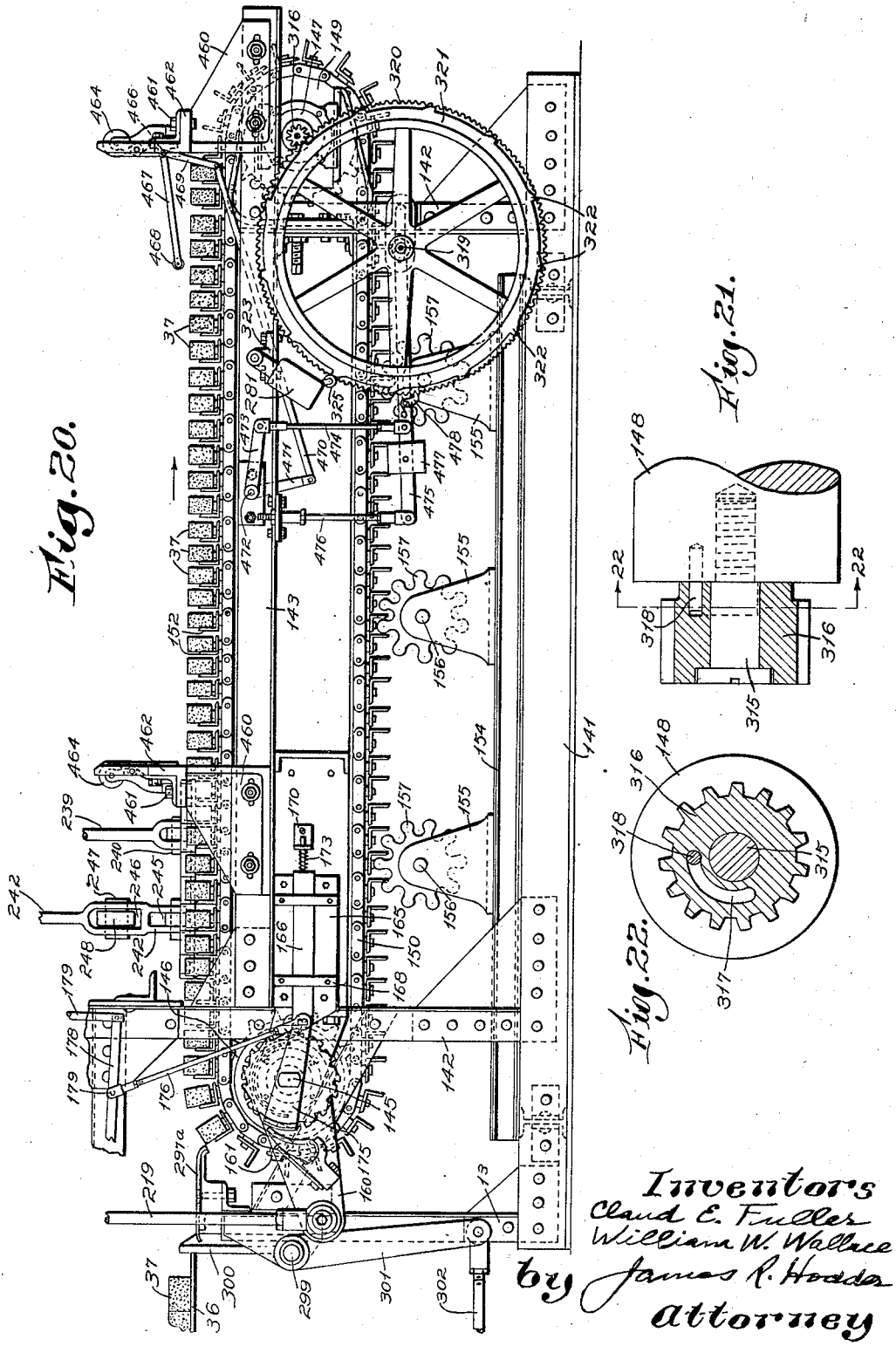

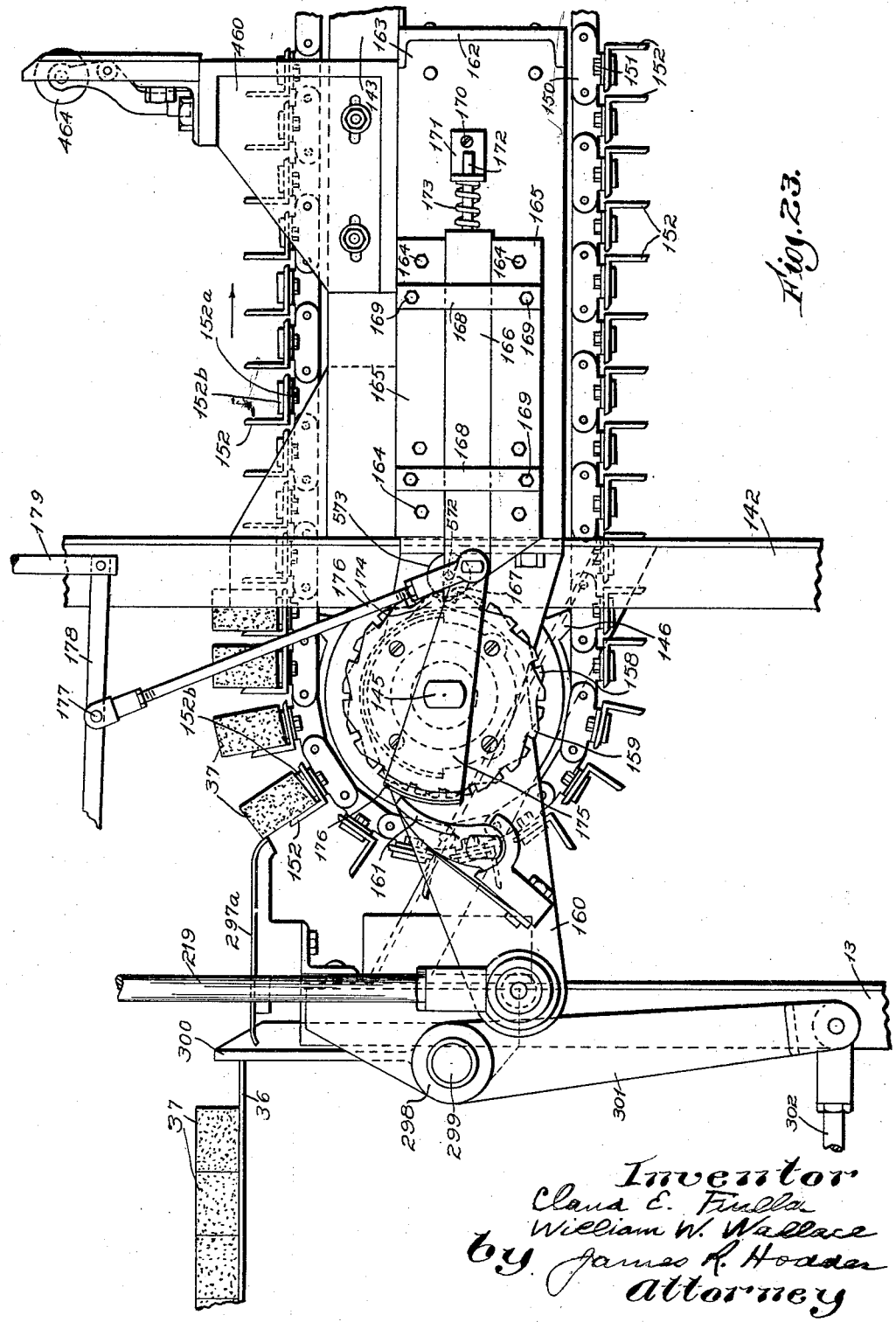

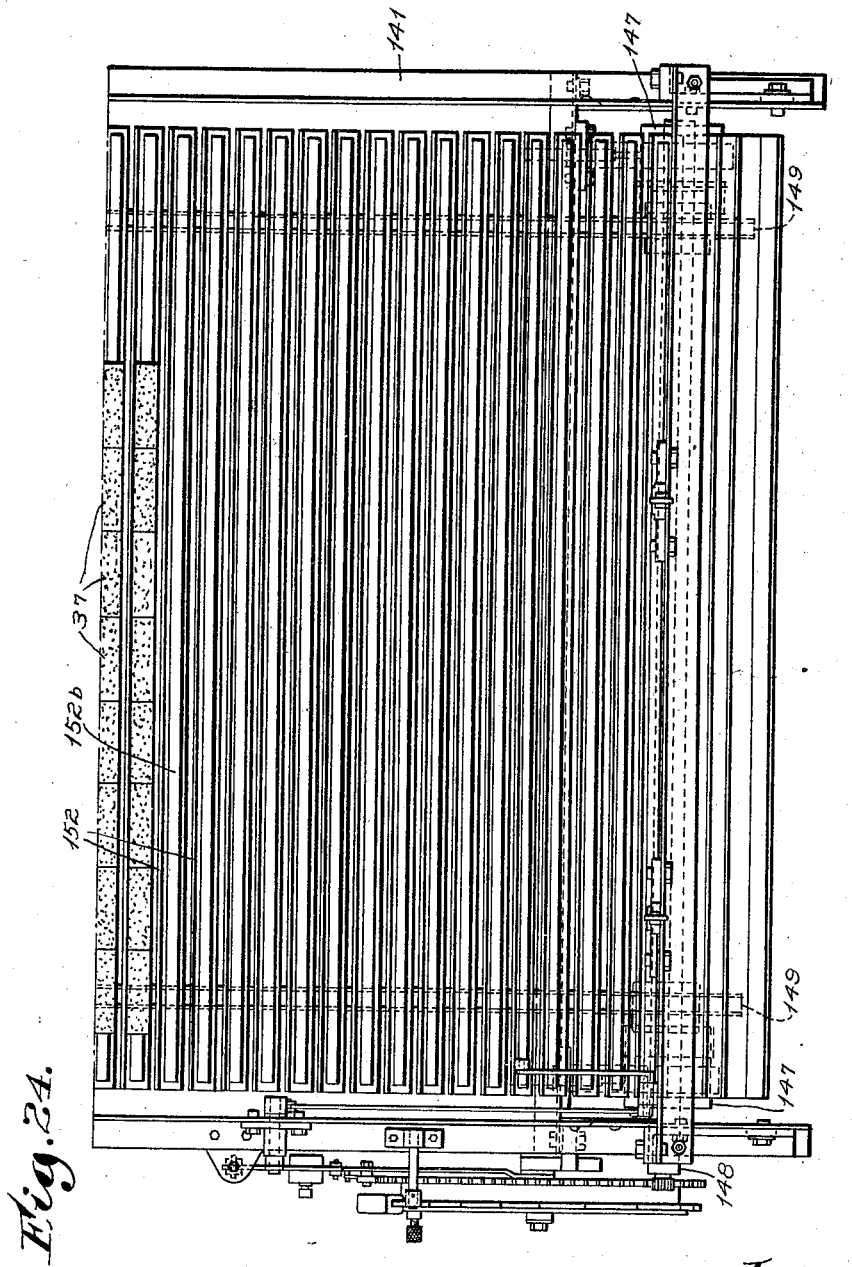

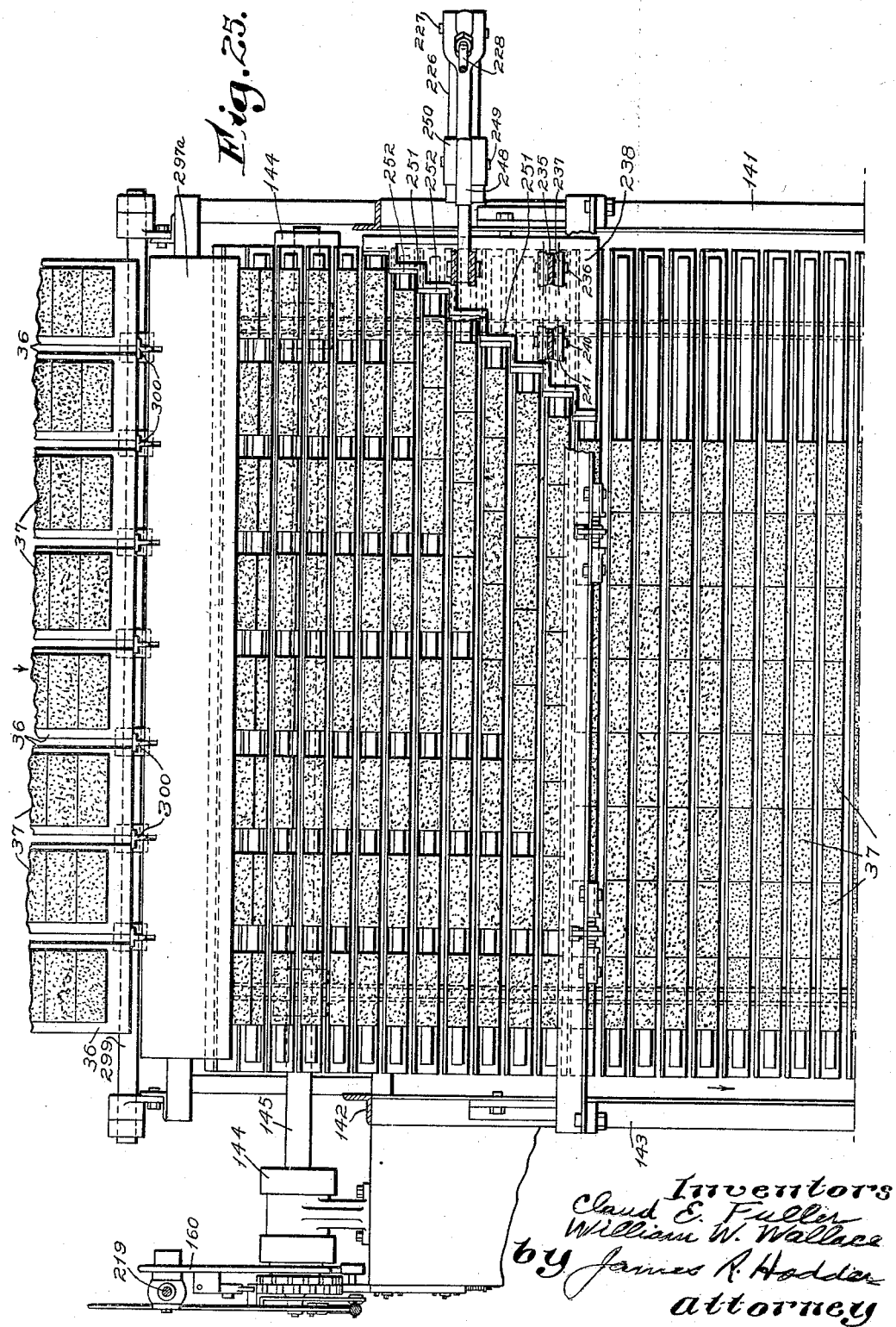

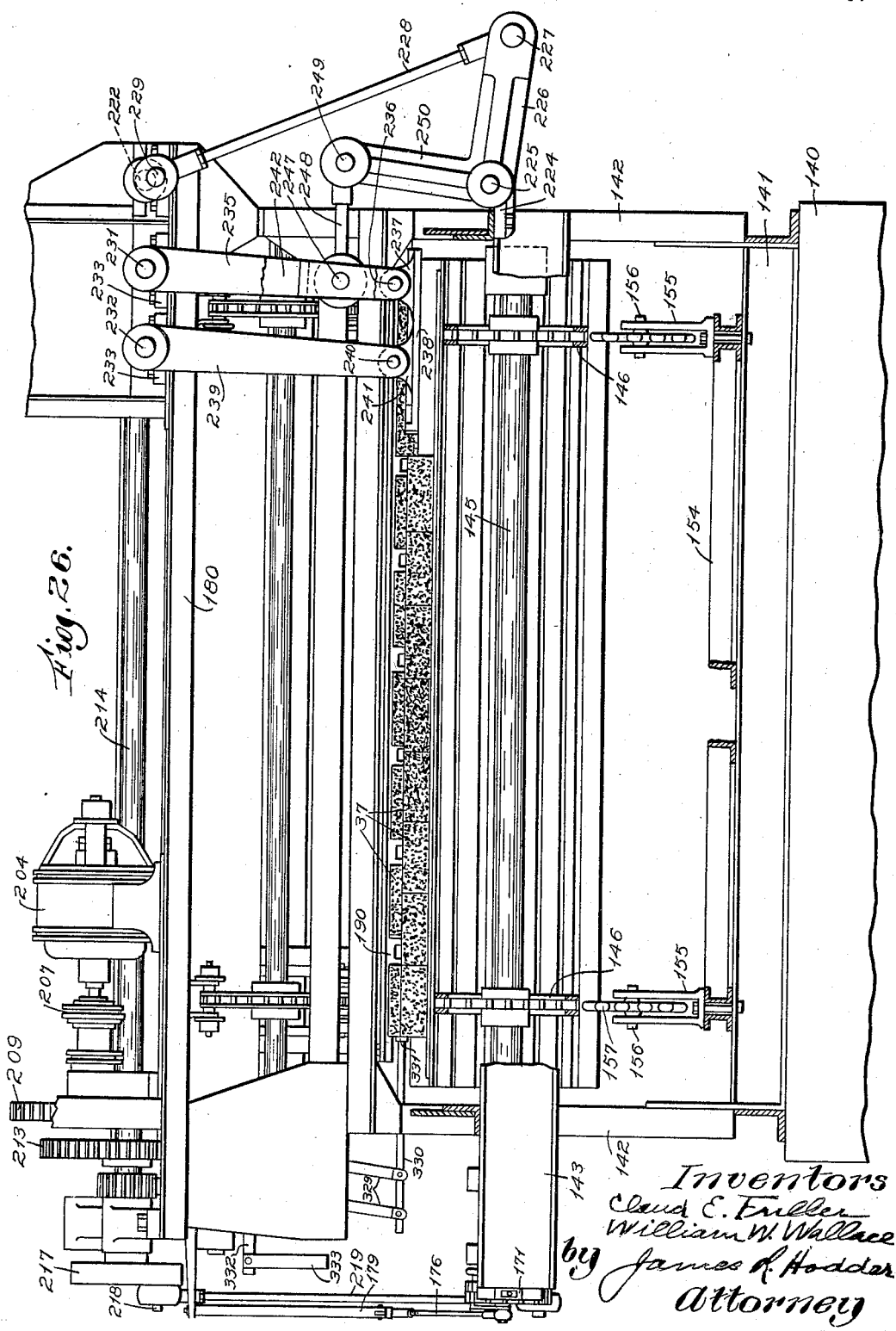

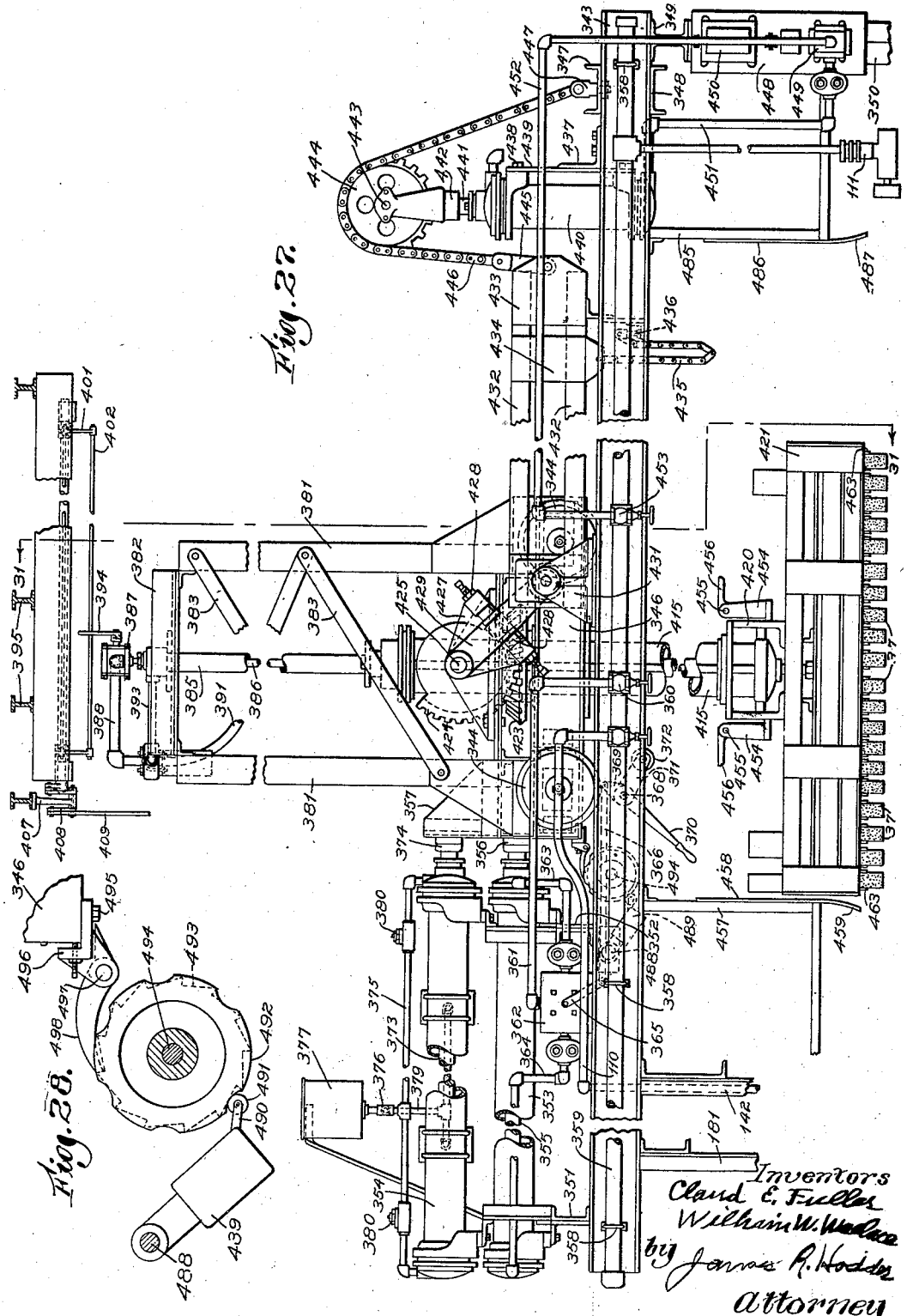

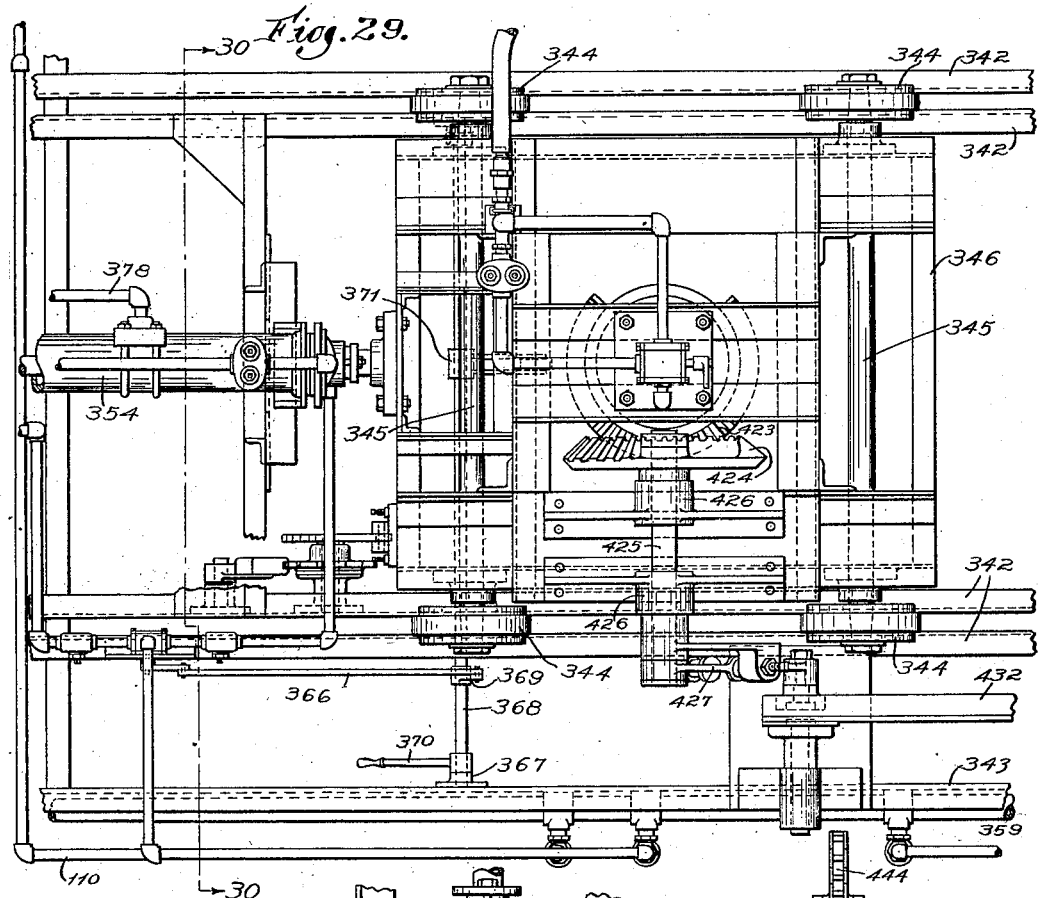
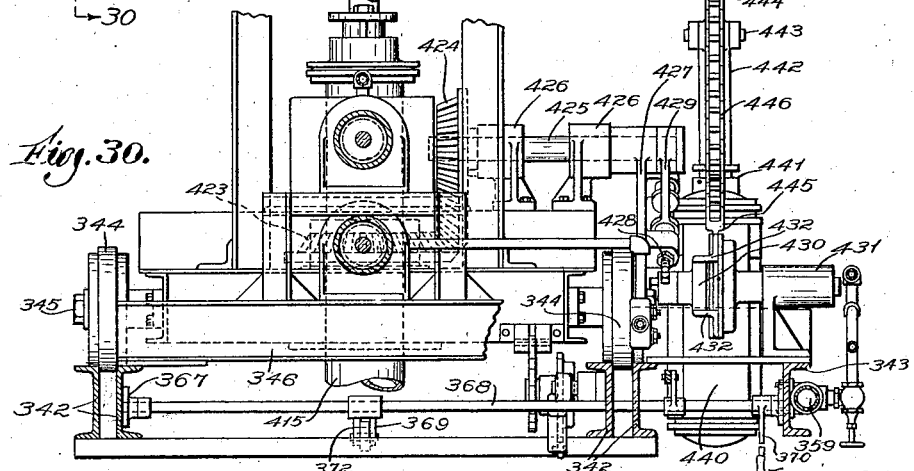

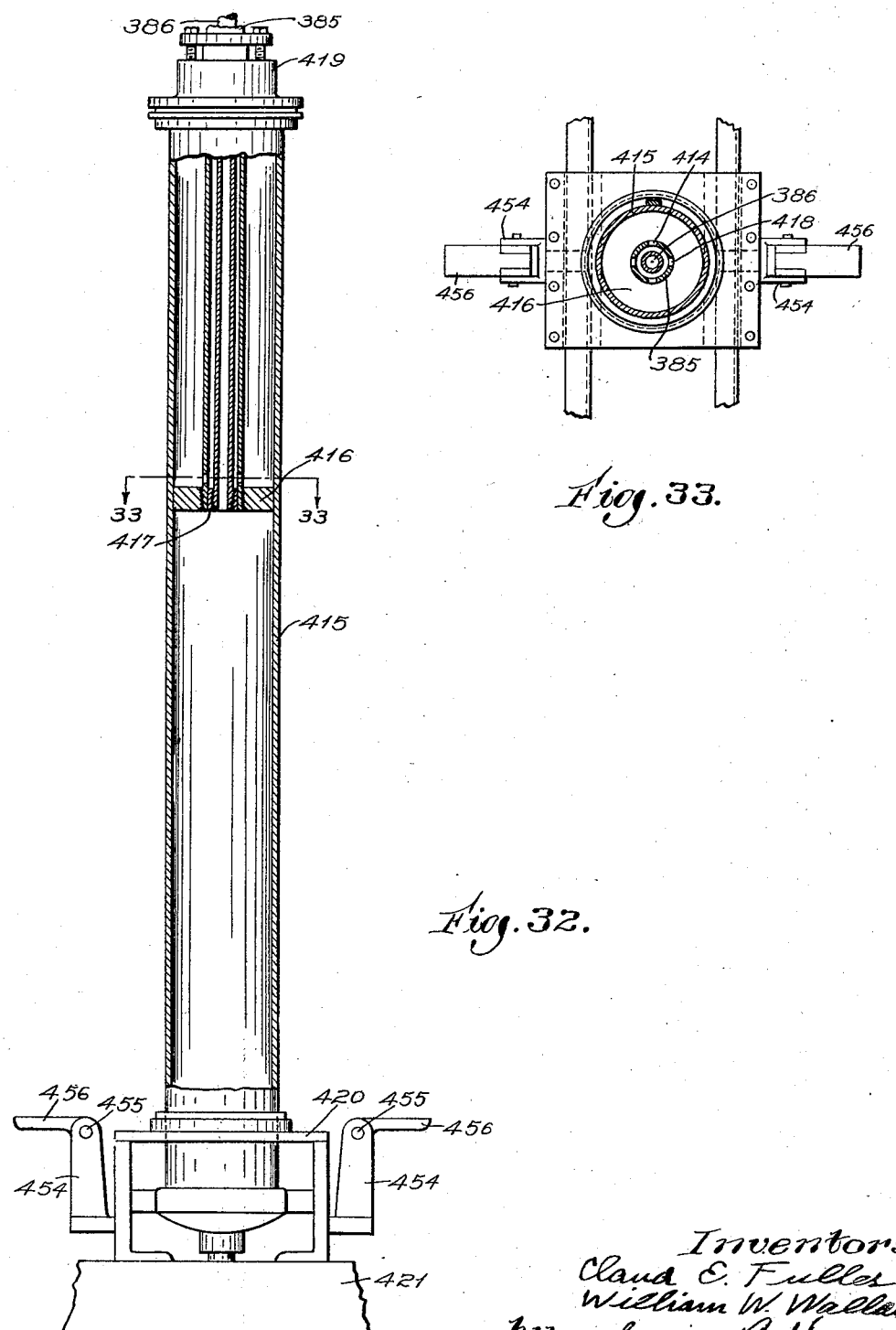

May 24, 1932.  C. E. FULLER ET AL  1,860,143
HACKING MACHINE
Filed Oct. 24, 1929   23 Sheets-Sheet 23

Inventors
Claud E. Fuller
William W. Wallace
by James R. Hodder
Attorney

Patented May 24, 1932

1,860,143

UNITED STATES PATENT OFFICE

CLAUD E. FULLER, OF NEW YORK, N. Y., AND WILLIAM W. WALLACE, OF CHICAGO, ILLINOIS; SAID FULLER ASSIGNOR TO NEW YORK BRICK HANDLING CORPORATION, OF NEW YORK, N. Y.

HACKING MACHINE

Application filed October 24, 1929. Serial No. 402,258.

Our present invention relates to the manufacture of brick and more particularly to an improved hacking machine.

There are two main processes for manufacturing brick, known respectively as the stiff mud process and the soft mud process. In the stiff mud process the material of which the brick is made is of such character and comes from the pug mill in such condition that it contains relatively little moisture and is extruded from a brick or slug making machine in the form of a continuous stream of clay. In the modern type of brick machine, usually two and sometimes more streams of clay in the form of slugs are simultaneously issued from the brick machine and the slug is deposited on an off-bearing belt, which moves onward at the same speed as the slug. After being deposited on the off-bearing belt, the slug or slugs is or are cut into brick length units and pass along with the off-bearing belt between two rows of men, known in the trade as belt boys, the number of boys depending on the number of streams of brick and on the speed of travel of the off-bearing belt. Such belt boys pick off the brick from the off-bearing belt and build them into unit stacks or piles on hacking cars, which hacking cars, when filled, are moved along a track and into the brick shed, where a mechanical loading device lifts the hack as a unit and deposits it in position in a kiln that is being built. In some of the later and improved methods of handling brick the slugs are carried along on the off-bearing belt without being cut into unit brick size and the slug is cut into such length as to contain within itself a predetermined number of brick lengths.

These elongated slugs are, by appropriate machinery, arranged in groups parallel to each other and the entire group then runs through or under gangs of saws arranged at proper intervals, and the entire group of slugs cut into unit brick size.

In the soft mud process the clay is of such character that it must be worked in a rather wet condition and consequently as it issues from the pug mill into the brick machine, it cannot be formed into bricks which will stand handling. Consequently in the soft mud process of manufacturing brick it has always been found necessary to form the bricks in moulds and afterwards to associate with the mould a pallet, after which the mould itself may be removed from the brick and from the pallet, leaving the brick or group of bricks lying in position on the pallet. The bricks on the pallet must then be subjected to a preliminary drying operation, such as in the open air or in a mechanically heated dryer before the brick can be handled manually or mechanically to build the same into hacks. In the latest form of brick machines the clay coming from the pug mill is deposited in the brick machine and a plurality of brick extruded simultaneously therefrom into a mould, which mould has been associated therewith a pallet and the mould is then removed from both the pallet and the brick and the pallet with the bricks thereon are carried preferably by a mechanical conveyor into a mechanical drying chamber, where the pallets containing the brick are removed from the conveyor and the dryer loaded to its capacity.

After the dryer is loaded, the heating plant is started in operation and the entire charge of brick subjected to a preliminary drying operation for a predetermined length of time, this length of time depending upon the condition of the weather and the condition and type of clay being worked upon. After the preliminary drying operation is completed the pallets containing the partially dried brick are placed on a conveyor and carried to a hacking room, where a plurality of belt boys, having duties similar to those utilized in the stiff mud process, remove the bricks from the pallets and build them into hacks, the empty pallets being returned to the brick making room for further use.

Mechanical devices have of late been perfected to the extent that it is now possible to take the loaded pallets from the brick making machine and carry them mechanically into a dryer where the dryer is also mechanically charged, subject the bricks to a preliminary drying operation, and afterwards, by mechanical means, remove the loaded pallets from the dryer and pass them on to the hacking room.

While a considerable amount of manual labor has in this manner been dispensed with, the most important point of the entire process is still unduly loaded with manual labor, that is the point at which the actual hacking of the bricks may take place. The hacking crew or belt boys are arranged in teams and the absence or disablement of a single man of a group or team will cause a shutdown of the entire process, as for the most economical production of bricks it is necessary that just enough men be employed in a team to remove the brick from the pallets as they pass continuously by the belt boys.

Too many belt boys result in confusion among the members of the team and add unduly to the expense of manufacture. Too few men in the team make it impossible for all of the bricks to be removed from the pallets as they pass, with the consequence that every brick that goes by the hacking team is spoiled as the pallets are carried on a conveyor which will dump the pallets and therefore the bricks shortly after the hacking team is passed.

With a view to improving the manufacture of brick, particularly by the soft mud process, we have devised the subject matter of the present invention and have arranged for mechanical apparatus to supplant the greater portion of the manual labor now employed at the hacking point of the process. Broadly speaking, our device consists of a pallet conveyor arranged at the exit end of the conveyor leading from a mechanical drying apparatus, which pallet conveyor will receive the pallets containing the brick, aligning both the pallets with respect to the conveyor and the bricks with respect to both the pallets and the conveyor, and moving such pallets along at a predetermined speed. A predetermined number of pallets of the stream of pallets is stopped in parallel relation with each other and at the proper time the bricks on all of such collected pallets are swept from all of the pallets simultaneously onto a receiving table. As soon as the bricks of the predetermined group of pallets are removed therefrom, the now empty pallets are automatically released and pass along the conveyor and by appropriate apparatus are moved manually back to the brick making room.

Simultaneously also the succeeding pallets are allowed to move onward and the next predetermined group brought into position as above outlined and the bricks removed therefrom onto a receiving table. This, what might be called a step-by-step grouping of pallets and removal of bricks therefrom, takes place continuously during the operation of the device. The receiving table is intermittently moved onward step-by-step to receive rows of brick that are being swept off a predetermined group of pallets, and as the brick of each row slide into position on the receiving table, they are automatically removed from the flat position in which they were originally placed on the pallet into an edgewise position with respect to the receiving table, or in such a position as to be properly placed in position in the unit hack or stack of brick. Associated with the receiving table is a pneumatic lifting device operable by a man in control of the entire mechanism and such lifting device may be of any suitable type and preferably that shown in the patent granted to Claud E. Fuller under No. 1,510,886 dated October 7, 1924.

Associated with the hacking machine are loading cars, such loading cars being of any desired type but preferably those described and claimed in the Patent No. 1,416,589 granted May 16, 1922. These loading cars are arranged on tracks and an empty loading car is arranged in position adjacent one end of the receiving table, where the operator, by controlling the lifting device, takes up a complete layer of brick simultaneously and simultaneously deposits the same on the loading car.

In order that the resulting hack of brick may be capable of successful handling by a mechanical loading means such for example as is shown in Patent No. 1,474,806 granted W. W. Wallace and dated Nov. 20, 1923, it is necessary that the first two layers of brick be arranged in pairs, except the outer rows, and that a space between adjacent pairs be provided. Succeeding layers contain more rows of brick than the first two layers and are arranged crosswise of each other at each succeeding layer. In order to carry out this method of operation and manner of building the stack we have associated with the receiving table an index mechanism that will automatically control the collecting mechanism when the first row of brick deposited on the collecting device has reached a certain definite position with relation to the vertical movement of the lifting device and which will bring such device into operation to allow the lifting device to descend, grasp the layers of brick, lift the same, carry the brick to a point above the loading car, lower the same and deposit the brick on the loading car. After the lifting device has moved forwardly to a certain point above the collecting table, such collecting table automatically moves onward again to receive more brick and this operation is repeated a second time. The index device now allows more layers to be positioned with respect to the lifting device and the operator, by manipulating the layers on the loading car, moves the upermost rows of brick so as to bring the same into pairs, with the exception of the outer layers.

Mechanism is associated with the lifting device so that on its third trip from the collecting table to the lowering car, the load of brick carried thereby is rotated through an angle of ninety degrees so that the third layer of brick is deposited on the finger course layers at right angles thereto and each succeeding layer of brick thereafter will be deposited on the preceding layer at right angles thereto. After the loading car is filled with brick so as to complete a hack, such loading car is moved into the kiln shed and an empty loading car placed in position. The device needs the supervision of but one employee and the mechanism is so arranged as to be operable by the employee to put the machine through any operation desired and which operation may be performed automatically.

The organization into a single unit of means for aligning bricks and pallets on a conveying apparatus and assembling a unit for assembling a plurality of pallets into a single unit, the provision of storage supply means associated with the source of supply and with the unit grouping of the pallets, a combined collecting and upedging device and means for removing a layer of brick of any predetermined extent, is believed to be new and applicants intend to claim the same herein broadly. Further, mechanism for constantly driving a conveying apparatus, which conveying apparatus has associated therewith at different points along the upper or one reach thereof, a pallet and brick aligning means, a storage collecting device and a group positioning device is also believed to be new and is claimed herein broadly.

The use of a collecting device that is also a brick-upedging device in connection with an automatically operated push-off device is believed to be new and also the unit of the collecting table or device, the upedging device and the push-off device are believed to be new per se, and are also claimed herein and also in separate applications to be hereinafter filed.

The principal object of our invention, therefore, is an improved hacking machine.

Another object of our invention is an improved combination of elements for effecting the aligning and straightening of brick pallets, the arrangement of such brick pallets into groups of predetermined size, and the removal from such groups of all of the bricks contained thereon at a single operation.

A still further object of our invention is an improved mechanism for initiating the operation of a push-off means for pushing off from a plurality of pallets all of the brick contained thereon at a single operation.

A still further object of our invention is the mechanism for automatically releasing the groups of pallets held at rest on a constantly movable conveyor so as to initiate the moving of such pallets out of the position occupied by them.

Other objects and novel features of the construction and arrangement of parts comprising our improved device will appear as the description of the invention progresses.

In the accompanying drawings illustrating preferred embodiments of our invention, Fig. 1 is a plan view of the entire machine;

Fig. 3 is an enlarged view of the upper right hand end of Fig. 1;

Fig. 4 is a side elevation of Fig. 3;

Fig. 5 is a sectional elevation on the line 5—5 of Fig. 3;

Fig. 7 is a side elevation of Fig. 6;

Fig. 8 is a section on the line 8—8 of Fig. 3;

Fig. 10 is a plan view of Fig. 9;

Fig. 11 is a sectional elevation on the line 11—11 of Fig. 9;

Fig. 12 is a sectional elevation on the line 12—12 of Fig. 11;

Fig. 13 is a plan view of the push-off mechanism in association with a portion of the pallet conveyor;

Fig. 14 is a side elevation from the left of Fig. 13 of the push-off mechanism;

Fig. 15 is a side elevation of the push-off mechanism shown in Fig. 14 and looking from the side opposite of that from which Fig. 14 was taken;

Fig. 16 is a sectional side elevation showing the push-off mechanism and taken on the line 16—16 of Fig. 13;

Fig. 17 is a perspective detail of one of the brick push-off bars;

Fig. 18 is a side elevation of one of the push-off bars and showing the manner of its connection to the endless chains;

Fig. 20 is a side elevation of the collecting table shown in association with the push-off mechanism and lifting mechanism in the lower central part of Fig. 2;

Fig. 21 is a detail of one of the driving shafts of the collecting table showing the manner of mounting the index pinion thereon;

Fig. 22 is a section on the line 22—22 of Fig. 21;

Fig. 23 is an enlarged elevation of the receiving end of the collecting table showing the manner in which the bricks are up-edged as they enter the slots of the collecting table;

Fig. 24 is a plan view of the outer portion of the collecting table;

Fig. 25 is a plan view on an enlarged scale of the collecting table showing the evening devices for the brick;

Fig. 26 is a front elevation of the push-off mechanism and showing the evening devices associated with the collecting table;

Fig. 27 is a side elevation of the lifting and transporting mechanism for moving the layers of brick;

Fig. 28 is a detail of a switch operating cam and its driving mechanism;

Fig. 29 is a plan view of the operating mechanism for hydraulic lift of the transporting mechanism;

Fig. 30 is a section on the line 30—30 of Fig. 29;

Fig. 32 is an elevation partly in section of the lifting cylinder of the hydraulic lifting device;

Fig. 33 is a sectional plan view on the line 33—33 of Fig. 32;

Fig. 35 is a circuit layout of the aligning mechanism controlling solenoid.

Figure 1:
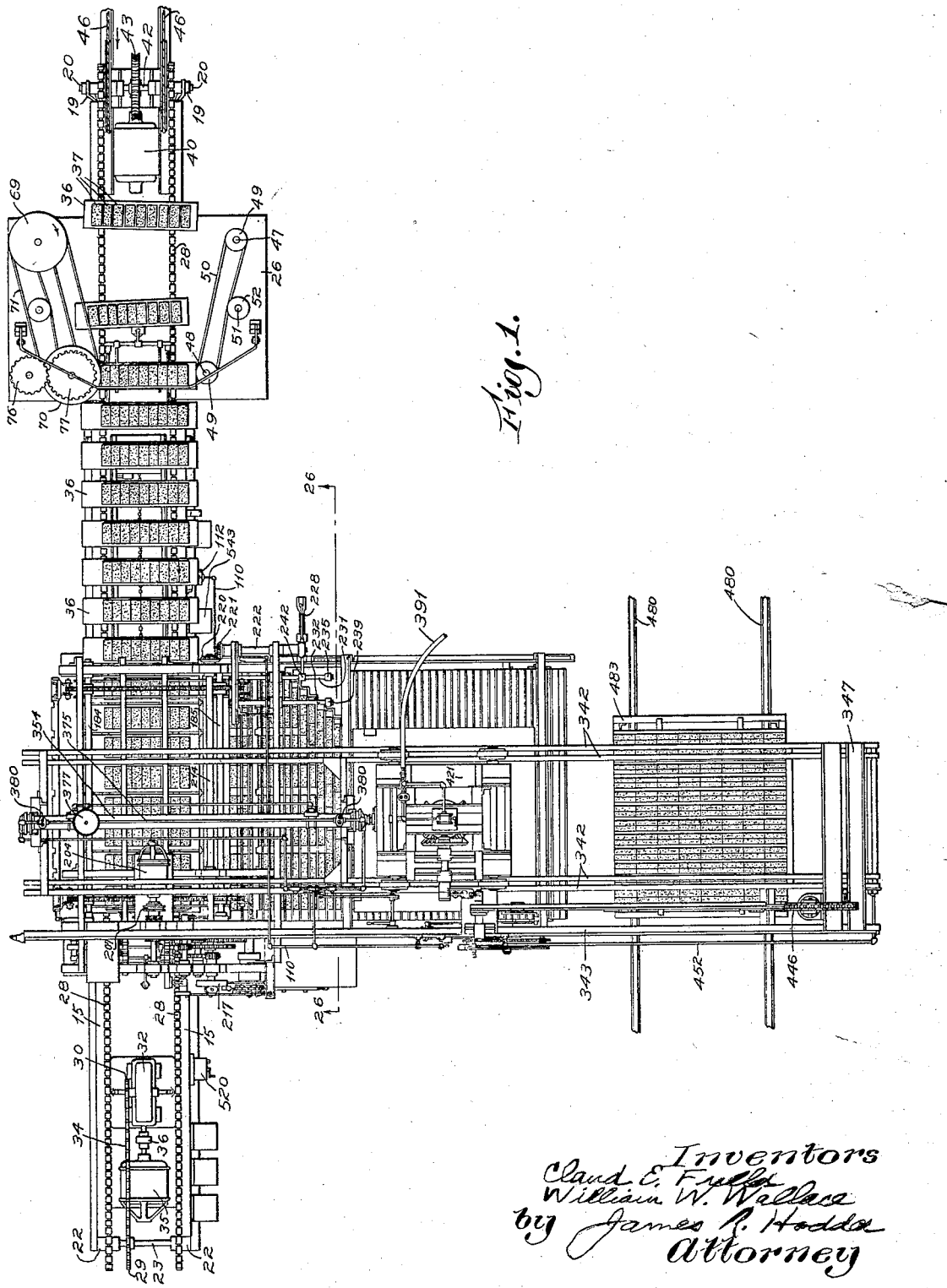

Referring to the drawings, there is shown an elongated rectangular framework designated generally by the reference numeral 10, this framework being composed of base members 11, arranged parallel to each other and spaced apart to any suitable distance by transverse members 12. From each of the side frame members 11 and at various points along the length thereof are upwardly extending standards 13 and to the upper ends of these standards are secured channel irons 14, these channel irons being thus arranged parallel to each other and spaced apart a distance substantially equal to the distance between uprights 13.

Secured to the upper ends or edges of the channel irons 14 and lying in a horizontal plane are plates 15 which form runways for a purpose to be hereinafter described. At one end of the rectangular framework 13, as for example the right hand end, as shown in Figs. 1 and 5, is built an extension comprising supporting bracket members 16 secured to the end uprights 13 and which bracket members support spaced angular members 17 secured to the ends of the spaced channel members 14 and in alignment therewith. Also secured to the top face of the angular members 17 and lying in the same horizontal plane as the plates 15 are plates 18. Secured to each of the members 17 at the free end thereof are bearing brackets 19 and in these bearing brackets and in alignment with each other are secured stub shafts 20. Rotatably mounted on each of the stub shafts are sprocket wheels 21 equal in pitch and diameter to each other. On the spaced uprights 13 at the end of the rectangular framework 10 remote from the extension formed of the members 16, 17 and 18, and adjacent the top end thereof are bearing blocks 22, which bearing blocks are in alignment with each other and rotatably mounted in such bearing blocks is a shaft 23. Secured to the shaft 23 and spaced apart from each other so as to be in alignment with the sprocket wheels 21 are sprocket wheels 24 and preferably, though not necessarily, such sprocket wheels 24 are of the same diameter as the sprocket wheels 21. The sprocket wheels 21 and 24 are thus arranged in pairs and over each pair of sprocket wheels runs an endless conveyor chain 25.

On the top of the channel irons 14 and at the right hand end of the rectangular framework 10 is secured a rectangular table 26, this table being of the same thickness as the plates 15 and the plates 18, against each of which one or the other edge of the table 26 abuts. The purpose of this table will be hereinafter described in detail. Secured to the top surface of the plates 18, table 26 and plates 15 and arranged parallel with each other and in alignment with the sprocket wheels 21 and 24 are tracks 27, with which engage the links of the endless conveyor 25 and thus act as means for having the upper reach of said endless conveyor chains 25 move in a right line. Associated with each link of the endless conveyor chain 25 is a member 28 and the outer or upper face of each of the members 28, when the conveyor chains 25 are moving in a horizontal plane, also lie in a horizontal plane and being relatively smooth, allow passage of the endless conveyor chains 25 under any article placed thereon, but held against movement, and without undue friction. Secured to the shaft 23 is a sprocket wheel 29, this sprocket wheel being in alignment with a sprocket wheel 30 secured to the driven shaft 31 of a reduction gear mechanism 32 mounted on a base 33 that lies within the limits of the rectangular frame 10. From the sprockets 29 and 30 runs an endless sprocket driving chain 34 and by means of which power is transmitted from the reduction gear mechanism 32 to the shaft 23 for the purpose of driving the endless conveyor chains 25, which it will be noted are driven in the same direction and at exactly the same speed.

Also mounted on the base 33 is a motor 35, this motor being connected by coupling 36 with the driving shaft of the reduction gear mechanism 32. The motor 35 is driven by power obtained from conductors 136 and 127 that are, in turn, connected to a main line 264 by a double pole switch 265. A conductor 518 is connected to the conductor 136 and to one terminal of the motor 35. The other terminal of the motor 35 is connected by conductor 519 to a rheostat 520 and this rheostat is connected by conductor 521 to the line conductor 127. By properly operating the rheostat 520, therefore, it will be obvious that power from the conductors 136 and 127 will operate the motor 35. Connected to the rheostat 520 by conductor 522 is the energizing winding of a magnetic switch 134, this switch being connected also by conductor 523 to a switch 139 and the switch 139 is, in turn, connected by conductor 524 to the main line conductor 136. Operation of the rheostat 520, therefore, to close the operating circuit for the motor 35 will also close the energizing circuit of the magnetic switch 134, assuming the switch 139 to be closed and, therefore, such magnetic switch will, by operating its armature 133, move into engagement with the contacts 132 for a purpose to be hereinafter described in detail. The energization of the magnetic switch 134 by the operation of the rheostat 520 will complete, through the coil 525 associated with such rheostat 520, a holding circuit to keep the rheostat 520 in operated position.

The purpose of the endless conveyor chains 25 is to move pallets 6, each containing a plurality of brick 37, from the right end thereof, as viewed in Fig. 1, to the left and during the passage of the pallets 36 the bricks 37 are removed therefrom.

The rectangular framework 10 rests on any suitable base, as for example a concrete base 38, and on this base beneath the extension 18 and the rectangular framework 10 is secured a base 39 and on this base is mounted a motor 40. Also mounted on the base 39 are bearing uprights 41, adjacent the upper end of which bearing members is rotatably mounted a shaft 42. Secured to the shaft 42 is a worm wheel 43 which meshes with and is driven by a worm 44 secured to the driving shaft of the motor 40. Also secured to the shaft 42 adjacent each end thereof are grooved pulleys 45 and in each of these grooved pulleys runs a rope conveyor 46. The grooved pulleys 45 are of such diameter as to have the rope conveyor 46 lie in substantially the same horizontal plane as lies the upper reach of the endless conveyors 25.

The rope conveyor 46 extends to a drying apparatus (not shown) for the bricks 37. The motor 40 is normally constantly operating and, therefore, the rope conveyor 46 is also normally operating and there is in consequence a practically steady stream of loaded pallets 36 coming from the dryer referred to (but not shown) and being deposited on the right hand or receiving end of the endless conveyors 25. The energizing circuit for the motor 40 and the manner in which the same may be controlled either manually or automatically will be described in detail hereinafter.

Figure 6:
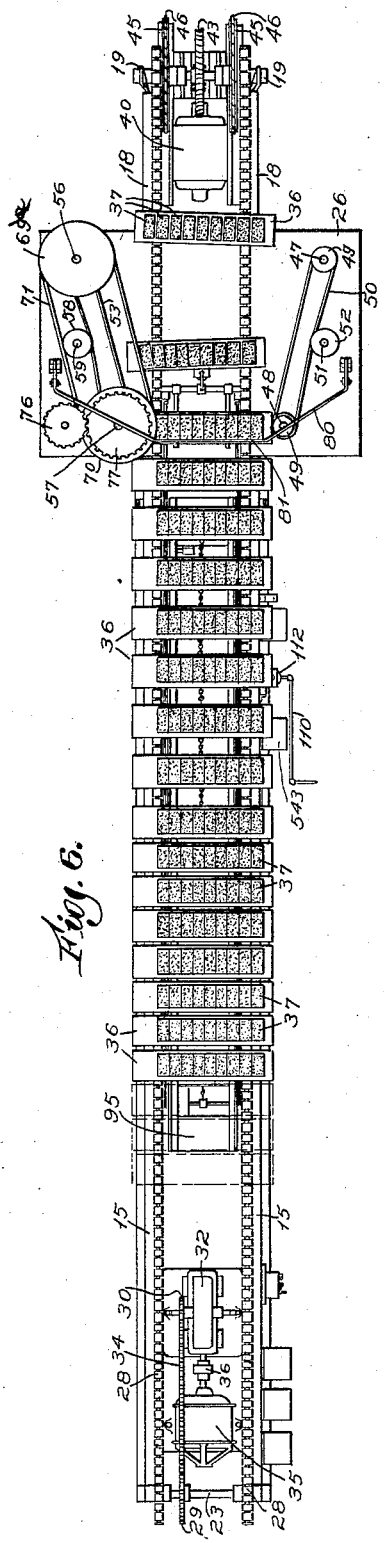
Fig. 6 is a plan view of the pallet conveyor showing the different mechanisms operable along the length thereof.

As ordinarily the drying apparatus referred to is at a considerable distance from the receiving end of the endless conveyors 25 and therefore the rope conveyor 46 is of considerable length and quite possibly has therein several turns, it has been found that the pallets 36 with the brick 37 thereon when received by the endless conveyors 25 are invariably out of alignment therewith, as has been attempted to show by the illustration in Figs. 1 and 6, where it will be noted that the last two pallets 36 and the brick 37 thereon are not symmetrically arranged with respect to the endless conveyors 25. To align both the pallets 36 and brick 37 with respect to the endless conveyors 25, we have secured to the table 26, and at one side thereof, rotatably mounted, vertically arranged shafts 47 and 48 respectively and on which shafts and on the upper side of the table 26 are secured pulleys 49. A line passing through the axes of the shafts 47 and 48 will lie at an acute angle with the direction of travel of the endless conveyors 25.

Over the pulleys 49 runs an endless belt 50 and in order to take up any slack that will develop in such belt 50, we have arranged adjacent such belt and on the table 26 a vertical shaft 51 having mounted thereon a pulley 52 that engages with the belt 50. The inner reach of the endless belt 50 travels, as will be seen from an inspection of Fig. 3 for example, in a path that lies at an angle to the direction of movement of the endless conveyors 25 and any pallet 36 being carried along by the endless conveyors 25 and the end of which happens to be offside or out of alignment with the path of movement of the endless conveyor 25 sufficient to engage with the endless belt 50 will be moved by said belt toward a central line lying between the endless conveyors 25 or into such a position as to have the pallet 36 come into symmetrical relation with respect to such conveyors 25. On the opposite side of the table from the endless conveyor 25 we arrange a similar endless belt 53 which is mounted for movement on pulleys 54 and 55 secured to shafts 56 and 57 respectively which are mounted for rotative movement. Associated with the endless belt 53 is an idler pulley 58 mounted for rotation on a vertically arranged shaft 59. The inner reach of the endless belt 53 is arranged at approximately the same angle to the direction of travel of the endless conveyors 25 as is the endless belt 50 and the belts 50 and 53 define an angular path or passage through which the pallets 36 must travel as they are moved along by the endless conveyor 25.

The distance between the peripheral surfaces of the pulleys 49 and 55 is substantially equal to the length of a pallet 36 and it will be obvious, therefore, that any pallet 36 out of alignment with the axes of the endless conveyors 25 will be moved into symmetrical arrangement therewith in order to pass beyond the pulleys 49 and 55. The belts 50 and 53 are constantly driven in the following manner. The shafts 48 and 57 are rotatably mounted in bearing members 60 and 61 respectively secured to the under side of the table 26. In each of the bearing members 60 and 61 are formed other bearing members 62 and 63 respectively and in the members 62 and 63 is rotatably mounted a shaft 64. Secured to the shaft 64 and spaced apart from each other are sprocket wheels 65 of suitable pitch and diameter and which engage with the under side of the upper reach of the endless conveyors 25. Rotary movement is, therefore, imparted to the shaft 64 in this manner. Secured to one end of the shaft 64 is a bevelled gear 66 which meshes with and drives a bevelled pinion 67 secured to the lower end of the shaft 48. Secured to the shaft 64 adjacent the bearing member 63 is a bevelled gear 68 similar to the bevelled gear 66 and this bevelled gear 68 meshes with and drives a bevelled gear 69 similar to the bevelled gear 67 and secured to the under or lower end of the shaft 57. In this manner, therefore, the shafts 48 and 57 are rotated in the same direction and at the same speed and, therefore, the inner reaches of the belts 50 and 53 move onward or in the same direction as the endless conveyors 25 and at the same speed thereas.

Rotatably mounted on the upper end of the shaft 56 is a pulley 69a and rotatably mounted on the shaft 57 is a pulley 70. Both the pulleys 69a and 70 are of greater diameter than either of the pulleys 54 or 55 and over such pulleys 69 and 70 runs a belt 71. The belt 71 lies above the belt 53 and thus lies over the pallets 36 and in position to engage with the bricks 37 on such pallets 36. The belt 71 operates to close up the space between the bricks 37, as will be apparent from an inspection of Fig. 3, where it will be seen that while the belts 50 and 53 position the pallets 36 with relation to the endless conveyors 25 the belt 71 will act on the bricks 37 to close up the space between the same and move the bricks over to a point adjacent one end of such pallets 36. The end of the shaft 64 remote from the end running in bearing 62 is rotatably mounted in a bearing member 72 secured to the under side of the table 26 and secured to the shaft 64 adjacent the bearing member 72 is a bevelled gear 73. The bevelled gear 73 meshes with and drives a bevelled pinion 74 secured to the lower end of the shaft 75 that is rotatably mounted in the bearing member 72 and which shaft extends upwardly to any desired distance. Secured to the upper end of the shaft 75 is a pinion 76 which meshes with and drives a gear 77 rotatably mounted on the upper end of the shaft 57 but secured to the pulley 70 by screws 78. The train of gears 73, 75, 76 and 77 is so proportioned as to give the belt 71 a surface speed practically equal to the surface speed of the belt 53 and there is, therefore, no tendency on the part of the belt 71 to sweep bricks 37 off of the pallet 36.

While the belts 50, 53 and 71 align the pallets and bricks with respect to the axes of the endless conveyors 25, they do not insure that either the pallets or the bricks come into a position perpendicular to the line of travel of such endless conveyors 25.

To accomplish this result we have devised the following mechanism: Secured to the table 26 on each side thereof are bearing blocks 79 and in which blocks is pivotally mounted a U-shaped member 80, this U-shaped member being provided with a front edge or face 81 that is of a length substantially greater than the combined length of the row of bricks 37 on a pallet 36. Normally the U-shaped member 80 is in the position shown in Figs. 5 or 8, that is, with a portion 81 thereof in position to engage with the row of bricks 37 on any oncoming pallet of bricks carried by the endless conveyors 25. Obviously, therefore, a row of brick engaging with the portion 81 of the U-shaped member 80 will be aligned perpendicularly to the line of travel of the endless conveyors 25. On the under side of the table 26 and on each side thereof are bearing members 82 in which are formed bearings in alignment with each other and in such bearings is rotatably mounted a shaft 83. Secured to such shaft and spaced apart from each other, while extending forwardly or in the direction of travel of the endless conveyors 25, are arms 84 that are provided at their outer or free ends with upstanding arms 85 and the upper ends of such upstanding arms normally lies at a point higher than the upper surface of the pallets 36. The upstanding portions 85 are in alignment with each other and lie in a plane that is perpendicular to the line of travel of the endless conveyors 25.

Therefore, it will be obvious that any pallet 36 being moved along by the endless conveyors 25 will engage with one or the other of the upstanding ends 85 of the arms 84 at first but later ultimately engage with both of said upstanding arms 85 as the pallet 36 is urged onward by the endless conveyor 25. A pallet 36 being moved along the endless conveyors 25 will, by means of the upstanding ends 85 of the arms 84, be positioned correctly with respect to the endless conveyors 25 and their line of travel. The arms 85 are positioned and timed to work in unison and in connection with the portion 81 of the U-shaped member 80 so that the pallets 36 and the bricks 37 thereon are aligned with respect to the endless conveyors 25 practically simultaneously. Connecting each arm 84 with the U-shaped member 80 is a pivotally mounted connecting rod 86 so arranged that an upward movement of the connecting rods 86 will cause an upward movement of the portion 81 of the U-shaped member 80 and a simultaneous and equal downward movement of the upstanding arms 85 of the arms 84 and conversely a downward movement of the connecting rod 86 will cause a simultaneous and equal movement of the member 81 and the upstanding ends 85 downward and upward respectively, or bringing the same back into the position shown in Fig. 8. Pivotally mounted on the rectangular frame 10 adjacent each of the endless conveyors 25 and the arms 84 are weighted levers 87. Each lever 87 has formed integrally therewith an upwardly and forwardly extending projection 88 at one end and a weight 89 at the other end. The weight 89 is sufficient to cause the forwardly projecting ends 88 to be held in their uppermost position as shown in Fig. 8, unless moved therefrom by some force.

That is, the forward extending end 88 lies in the path of movement of the upstanding ends 85 of the arms 84 and will engage with the forward edge of a pallet 36 slightly before such forward edge of the pallets 36 can engage with both of the upstanding ends 85 simultaneously. Secured to the shaft 83 between the arms 84 is a lever 89, to the outer free end of which is pivotally attached the upper end of a plunger armature 90 of the solenoid 91 that is secured to a bracket 92 fixed to the framework 10. Associated with each of the levers 87 is a switch 93, which switch is normally opened and one switch is connected to a source of power 94, while the other switch is connected to the solenoid 91, as clearly shown in Fig. 35. It is, therefore, necessary for both switches 93 to be closed before the solenoid 91 can be energized to operate the plunger armature 91 thereof and thus through the connecting rods 86 operate the upstanding ends 85 of the arms 84 and the U-shaped member 80 so as to release a pallet 36 and the bricks 37. As a pallet 36 is moved along by the endless conveyors 25, as from right to left in Fig. 3, the end of such pallet 36 may be out of alignment or not symmetrically arranged with respect to the conveyors 25 and, therefore, one or the other end of such pallet will engage with either the belt 53 or the belt 50 and will be brought into practically central position with respect to the converging passage defined by such belts 50 or 53. Also, as the pallet 36 moves onward the bricks 37 thereof are engaged by the belt 71 and are moved in such manner as to crowd the same over to one end of the pallet 36.

As the pallet 36 and bricks 37 move onward, it is possible that one end of the forward edge of such pallet 36 will engage with one or the other of the upstanding ends 85, whereupon such end of the pallet will be arrested and the endless conveyors 25 will move the other end of such forward edge up or forward until the same is brought into engagement with both of the upstanding ends 85 simultaneously. Simultaneously with this operation the bricks 37 on such pallet are being engaged by the portion 81 of the U-shaped member 80 and are aligned with respect to the pallets 36 and with respect to the direction of travel of the endless conveyors 25. A short time before the pallet 36 can engage with both of the upstanding ends 85 of the arms 84 the pallet 36 will have engaged one and then both of the forwardly extending ends 88 of the levers 87, causing in this manner the switches 93 to be operated so as to close the energizing circuit for the solenoid 91 from the source of power 94 through the switches 93 and through the solenoid 91 back to the source of power. The solenoid 91 operating will, by means of its plunger armature 90, swing the portion 81 of the U-shaped member 80 upward out of engagement with the bricks 37 and will swing the upstanding ends 85 of the arms 84 downward out of engagement with the pallet 36 and the endless conveyor 25 will move the aligned pallet and bricks thereon onward or to the left as viewed in Fig. 3. The pallet 36 will thus ride over the upper end of the forward and upwardly extending members 88 and thus maintain the solenoid 81 energized until the pallet 36 has passed.

As soon as the pallet 36 has passed, the weight 89 will swing the upwardly extending portions 88 back into their original position and the lever 87 will disengage with the switch 93 thus opening the contacts for the solenoid 91, which thereupon de-energizes and the U-shaped member 80 and arms 84 move back into their original position. These operations are performed very rapidly and there is practically no hesitation on the part of the loaded pallets and they seemingly are carried forward by the endless conveyors 25 in a continuous stream.

After passing the mechanism associated with the table 26 as above described, the endless conveyors 25 carry the loaded pallets 36 with the bricks thereon now crowded together and positioned adjacent one end thereof, as clearly shown in Figs. 1 and 6, and will continue their onward movement until brought to rest by the following means. Within the limits of the rectangular framework 10 is a rectangular framework 95 of suitable length and of such dimensions as to be movable within the limits of the rectangular frame 10. Adjacent each end of the rectangular frame 95 and secured to the bottom face thereof and on each side are bearings 96. The bearings 96 at each end are in alignment with each other and in the pair of bearings is rotatably mounted a shaft 97. Secured to oppositely arranged uprights 13 of the rectangular frame 10 and adjacent the shaft 97 are secured bearing members 98, these bearing members 98 being likewise arranged in pairs and in alignment with each other and in the pair of aligned bearings is rotatably mounted a shaft 99.

Secured to the shafts 99 adjacent each end of the bearings 98 is a link or lever 100 that is pivotally attached at its outer end to the shaft 97. Secured to the shaft 99 adjacent one end thereof is a lever 101 and to the outer free end of such lever 101 is pivotally attached a depending member 102, on which may be placed counterbalancing weights 103. The counterbalancing weights 103 are sufficient to move and maintain the rectangular frame or carriage 95 in its uppermost position or with the upper surface thereof lying practically in the same plane as the top surface of the rectangular plane 10.

Pivotally attached to the levers 101 intermediate the ends thereof is the upper end of a connecting rod 104 and the lower end of this connecting rod is pivotally attached to a piston rod 105 attached to a piston (not shown) working in an air cylinder 106 that is attached to the lower portion of the rectangular framework 10. Of necessity there are two of the cylinders 106 and the mechanism operated thereby in order that the rectangular framework or carriage 95 may be maintained in balanced relation to the rectangular framework 10. The cylinders 106 are, therefore, connected together by a pipe 107. The cylinders 106 are preferably air cylinders and the pipe 107 is, therefore, an air line connecting these two cylinders. This pipe 107 is connected by pipe 108 to an air valve 109, which in turn is connected by pipe 110 to a suitable source of air supply naturally under pressure, as for example the compressor 111 operated in a suitable manner. The air valve 109 is operated by a solenoid 112. The manner in which this solenoid is operated to control the pistons in the air cylinders 106 will be hereinafter described in detail.

It is sufficient at this point to state that the simultaneous operation of the pistons in the air cylinders 106 moves the pistons 105 upwardly and rotates the levers 101 so as to depress or lower the rectangular framework 95 with respect to the rectangular framework 10 for the purpose of releasing certain devices to be described.

Secured to the framework or carriage 95 on each side thereof and spaced along the length of the carriage are bearings 113, these bearings being arranged in pairs in alignment with each other and in each pair of aligned bearings 113 is rotatably mounted a shaft 114. Secured to each end of each shaft 114 is an arm or lever 115 and to the free end of each arm or lever 115 is secured, as by riveting, an upwardly extending stop finger 116. The stop fingers 116 are, therefore, arranged in pairs and each pair is preferably numbered for convenience as No. 1 pair, No. 2 pair, No. 3 pair, etc. The number of pairs of stop fingers 116 may be any desired but in the present showing we have utilized fifteen pairs of stop fingers although more or less may be employed, should it be deemed desirable. Secured to each shaft 114 at substantially its central point is a lever 118. To the upper end of the arm or lever 118 associated with the first pair of stop fingers 116 is attached one end of a chain or other flexible member 119 and the other end of this chain or other flexible member is attached to the arm 118 associated with the No. 2 pair of stop fingers 116 and at substantially the middle point of such arm. The upper end of the arm 118 attached to the shaft 114 and associated with the No. 2 pair of stop fingers 116 has attached to its upper or free end one end of a chain or other flexible member 119.

The other end of this chain or other flexible member is attached to substantially the middle point of the arm 118 associated with the No. 3 pair of stop fingers 116. This arrangement prevails throughout the entire group of stop fingers 116 and, referring to Fig. 9, it will be noted that the pairs of stop fingers Nos. 1, 2, 3 and 4 are in substantially vertical position and have been moved so by having a pallet 36 with brick 37 thereon engage the same. Still referring to Fig. 9 it will be noted that the No. 5 pair of stop fingers 116 lies but a short distance above the upper surface of the members 28 carried by the endless conveyor chains 25 or in such position that the next succeeding pallet 36 with brick 37 thereon will engage with the No. 5 pair of stop fingers and will move the same into the vertical position now occupied by pairs 1 to 4 inclusive. It will be noted also that the No. 6 pair of stop fingers 116 have their upper ends a short distance below the upper surface of the members 28 carried by the endless conveyor chains 25 or in such position that pallet 36 with brick 37 thereon may be moved along by the endless conveyors 25 without contacting with such pair of stop fingers No. 6. The chains 119 or other flexible members connecting the arms 118 of adjacent pairs is of such length that when, for example, the No. 4 pair of stop fingers 116 has moved into the position shown in Fig. 9, the length of chain connecting the arm 118 associated with the No. 4 pair of stop fingers will pull the arm 118 associated with a No. 5 pair of stop fingers sufficiently to rotate the shaft 114 associated with said No. 5 pair so as to bring the No. 5 pair of stop fingers into the position shown in Fig. 9 or into the position where such pair of stop fingers will be engaged by the next succeeding pallet 36 carried by the endless conveyors 25.

Figure 9:
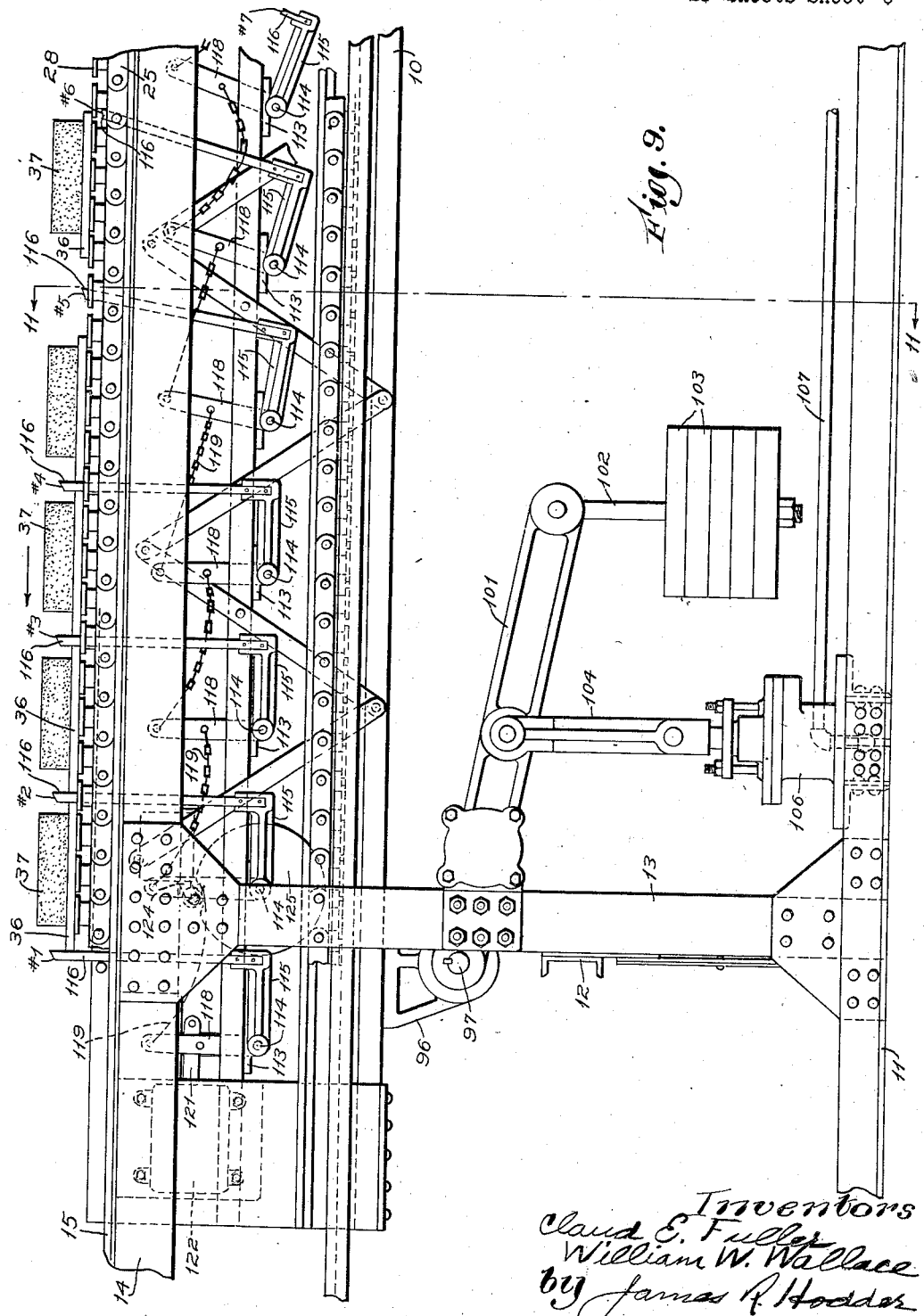
Fig. 9 is a side elevation on an enlarged scale of that portion of the machine shown in the dot and dash square indicated by the numeral 9 in Fig. 7.

The movement of the pair of stop fingers No. 5 into the position shown in Fig. 9 will not affect the position of the next succeeding No. 6 pair of stop fingers 116. The pair of stop fingers No. 6 shown in Fig. 9 may, therefore, be said to represent the normal or inoperative position of the stop fingers carried by the rectangular frame-work or carriage 95 and that numbered 5 represent the operative position of such stop fingers, while Nos. 1, 2, 3 and 4 pair represent the operated position. It will be obvious that as the endless conveyors 25 move pallets 36 onward over the rectangular framework 10, that there will be a pair of stop fingers 116 interposed between each pair of pallets 36. Secured to the shaft 114 associated with the No. 1 pair of stop fingers 116 is an arm 120, to the upper end of which is pivotally attached one end of a plunger armature 121 of a solenoid 122. The solenoid 122 is controlled by a circuit having a plurality of break points therein, one of which break points is operated by the normally closed controlling switch 123, this switch being mounted in any suitable manner on the carriage 95. Arranged above the rectangular framework 10, and which will be referred to again in the description, is a frame 180. Secured to the frame are pairs of aligned bearings 326 and rotatably mounted in such bearings are parallelly arranged shafts 327 and 328. Secured to the shafts 327 and 328 and extending downwardly therefrom are arms 329 and to the lower ends of such arms is arranged a pair of parallelly arranged substantially horizontally disposed arms 330.

Secured to one end of each of the arms 330 and lying parallel to the row of brick 37 on the pallet 36 is a brick stop 331 adapted to be engaged by the brick 37 as the same are moved along by the conveyor 25. Secured to the shaft 327 and extending laterally outward therefrom is an arm 332, to the outer end of which is pivotally attached a weight 333 and which weight tends to rotate the shaft 327 and, therefore, the shaft 328 in a counter clockwise direction, as viewed in Fig. 19, and this moves the brick stop to the right, as viewed in such figure, or into position to be engaged by the oncoming row of brick on the pallet 36. Secured to the shaft 327 is a cam member 336 which is adapted to operate a pivoted switch arm 337a of a switch 337. The switch arm 337a is adapted to engage with a contact 337b but is normally out of engagement therewith. The switch arm 337a is connected by conductor 509 to one end of the energizing winding of the switch 123 and the other end of such energizing winding is connected by conductor 510 to the main line conductor 136. The contact 337b is connected by conductor 512 to the switch arm 124 that is adapted to be operated by the cam 125 on the shaft 114 of the No. 2 pair of stop fingers 116. The switch arm 124 is adapted to engage with a switch contact 513 that is connected by conductor 514 to the solenoid 122 and to the main line conductor 127. The solenoid 122 is also connected by conductor 515 to a contact 516 associated with the switch 123, and also associated with the switch 123 is a contact 517 also connected to conductor 510.

Figure 19:
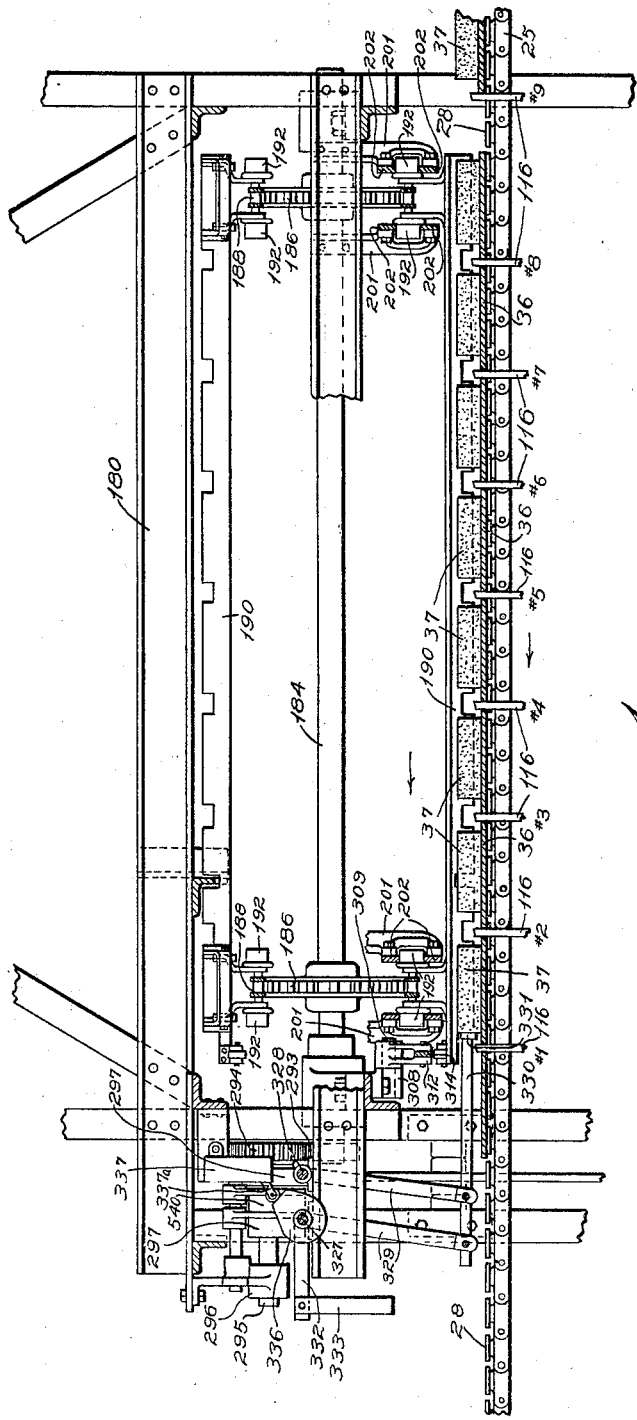
Fig. 19 is a sectional elevation on the line 19—19 of Fig. 16.
Figure 31:
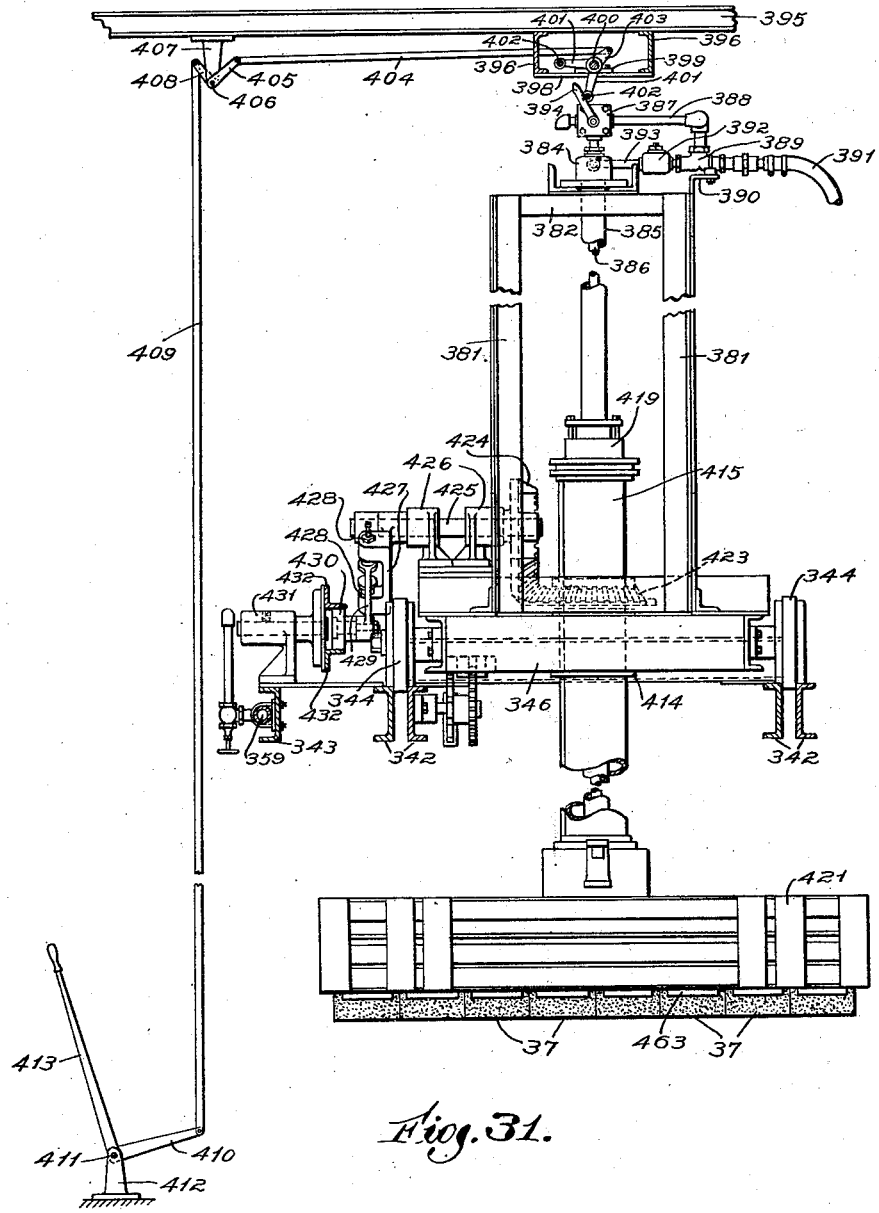
Fig. 31 is an elevation partly in section of the hydraulic lift with the pick-up mechanism attached thereto.

As the pallets 36 move onward in the direction of the arrow shown in Fig. 19, for example, the row of brick 37 on the first pallet 36 engages with the brick stop 331 and pushes the same to the left, as viewed in such figure. This movement of the brick stop 331 imparts a corresponding movement to the members 330 and, therefore, through the downwardly depending members 339, a rotary movement to the shaft 327 and 328. The cam 336 engages with the switch arm 337a and moves the same over into engagement with the contact 337b. At this time the contacts 124 and 513 are in engagement with each other and, therefore, a circuit is now closed from main line conductor 127, conductor 514, switch contacts 513 and 124, conductor 512, contact 337b, switch blade 337a, conductor 509, energizing winding of the switch 123, conductor 510, to the other main line conductor 136. The switch 123 is energized forcing its armature into engagement with the contacts 516 and 517 and thus closing, in turn, a circuit from the main line conductor 127 through conductor 514, solenoid 122, conductor 515, contacts 516 and 517, conductor 510 to main line conductor 136. The solenoid 122 acts on the plunger armature 121 and moves the first pair of stop fingers 116 into the position occupied by the No. 5 pair of stop fingers 116 in Fig. 9. Further advance of the first pallet 36, therefore, will cause the same to engage with the No. 1 pair of stop fingers 116 and such stop fingers move into the position shown in Fig. 9 and by means of the chain 119 they pull the No. 2 pair of stop fingers 116 into the position now occupied by the No. 5 pair of stop fingers, or in other words, into such position as to be engaged by the second pallet 36 being moved along by the endless conveyors 25.

As the second pair of stop fingers 116 are engaged by the second pallet 36 and are moved from the position occupied by the No. 5 pair of stop fingers to that shown for the No. 2 stop fingers in Fig. 9, the shaft 114 on which such stop fingers are mounted will rotate in a counterclockwise direction, thus rotating the cam 125 and such cam 125 will allow the switch arm 124 to move out of engagement with the contact 513, thus breaking the energizing circuit for the switch 123 and this breaking of the circuit also breaks the energizing circuit for the solenoid 122 at the contacts 516 and 517. The de-energizing of the solenoid 122, however, will not cause the No. 1 pair of stop fingers 116 to return to their normal position, as the friction of the first pallet 36 is sufficient to maintain such pair of stop fingers in the operated position, or in the position shown in Fig. 9. Eight pallets 36 are allowed to accumulate side by side and means are provided, which will be hereinafter described, for pushing the brick off the pallets onto suitable collecting devices. Other pallets beside the eight pallets referred to may be on the endless conveyors 25 and such pallets may accumulate under certain conditions until fifteen pallets are arranged parallel to each other on the endless conveyors 25. The pallets, however, may be fed to the endless conveyors 25 indefinitely regardless of whether or not the mechanism were functioning properly unless some means were provided to control the rope conveyors 46.

The motor 41 is energized by a circuit as follows: Main line conductor 126, conductor 526, one terminal of the motor 40, the other terminal of the motor 40, conductor 527, contacts 137, armature 138 of a magnetic switch 129, conductor 528 and to main line conductor 127. This circuit is only closed if the magnetic switch 129 is energized and this switch is energized by a circuit traced from main line conductor 127, conductor 128, energizing winding of the magnetic switch 129, conductor 130, normally closed switch 126 associated with the No. 13 pair of stop fingers 116, conductor 131, contacts 132 and armature 133 of magnetic switch 134, conductor 135 to main line conductor 136. Again as in the case of the energizing circuit for the motor 40, the circuit for the magnetic switch 129 is only closed when the magnetic switch 134 is operated. The magnetic switch 134 is operated on operation of the rheostat 520 to control the motor 35 and also it is assumed that the switch 139 is closed. When, therefore, a pallet 36 engages with the No. 13 pair of stop fingers 116, the operating cam 529 will allow the normally closed switch 126 to open, thus breaking the energizing circuit for the magnetic switch 129, which, in turn, releases its armature 128 from the contacts 137 and, therefore, breaking the energizing circuit for the motor 40. This will cause a shutdown of the rope conveyor 46 and no more loaded pallets 36 will be fed to the endless conveyors 25.

The endless conveyors 25, however, will feed onward loaded pallets 36, assuming any are now located thereon, until the No. 15 pair of stop fingers 116 is engaged by the pallets. The operator of the mechanism may control the motors 35 and 40 at any time by the switch 139, this switch 139 being located within easy reach of the operator.

If the pairs of stop fingers 1 to 4 inclusive shown in Fig. 9 are lowered so as to be out of engagement with the pallet 36, they will all assume the position now indicated by the pair of stop fingers No. 6, in which case the shaft 114 associated with the No. 2 pair of stop fingers 116 will rotate the cam 125 and will operate the lever 124 so as to close the contacts of the controlling switch 123, so that, therefore, the No. 1 pair of stop fingers 116 will start to assume the position of the No. 6 pair of stop fingers 116.

Immediately the carriage 95 is moved downwardly so as to bring the upper ends of the pairs of stop fingers 116 below the pallets 36, the switch 126 is closed again and the magnetic switch 134 remaining closed and a hand switch 139 remaining closed, the magnetic switch 129 immediately becomes operative again and the motor 40 is started in operation to again feed loaded pallets 36 to the endless conveyors 25. Adjacent the rectangular framework 10 and opposite that portion thereof where the pairs 1 to 8 of the stop fingers 116 are located are arranged bases 140 of suitable dimensions and spaced apart from each other so as to act as a support for the rectangular framework 141 of preferably channel irons.

Secured to the base 141 and extending upwardly therefrom are pairs of uprights 142. Secured to the pairs of uprights 142 adjacent their top ends is a rectangular framework 143 which lies in a substantially horizontal plane and certain portions of which act as a track on which runs a collecting and conveying apparatus to be hereinafter described. Secured to the rectangular frame 143 adjacent one pair of the uprights 142 are aligned bearings 144 and in this pair of aligned bearings is rotatably mounted a shaft 145. Secured to the shaft 145 but spaced apart from each other are sprocket wheels 146. Secured to the pair of uprights 142 at the other end of the rectangular frameworks 141 and 143 are aligned bearings 147, in which aligned bearings is rotatably mounted a shaft 148. Secured to the shaft 148 and spaced apart from each other so as to be in alignment with the sprocket wheels 146 are sprocket wheels 149.

Over the aligned pairs of sprocket wheels 146 and 149 run endless conveyor chains 150. Secured to the endless conveyor chains 150 by bolts 151 are angle irons 152, these angle irons being arranged parallel to the shafts 145 and 148 or transversely to the length of the endless conveyor chains 150 and thus the angle irons 152 form a plurality of parallelly arranged troughs, of which one side of the angle iron is the bottom and the other side of the angle iron is one side of the trough, the other side of the trough being formed by the adjacent side of the next succeeding or preceding iron. Secured to each of the angle irons 152, as by bolts 152a, are channels 152b, and by referring particularly to the channel 152b in which the brick 37 has just fallen from the plate 297a, it will be noted that such channel has its upper face lying at an angle to the outstanding face of the angle iron 152. Further, it will be noted that such channel 152 does not occupy the entire width of the side of the angle iron 152 with which it is in engagement and, therefore, the brick 37 coasting off the plate 297a, will not strike on its entire side face.

In Fig. 23, to which reference is particularly made, the amount of draw or angle of the side faces of the brick 37 are somewhat exaggerated and it will be obvious therefore that a brick 37 falling on the upper face of the channel 152b will have no tendency to have the upper edge thereto tip forward as the outwardly extending face of the angle iron 152 and the upper face of the channel 152b form a wedge-shaped device into which the brick becomes wedged.

The upper reach of the endless conveyor chains 150 and, therefore, the plurality of parallelly arranged troughs formed in such upper surface are supported in substintially a horizontal plane by the upper surface of parallel members of the rectangular frame 143. Secured to the upper surface of the rectangular base 141 is a sub-base 154 and on such sub-base are arranged pairs of bearing members 155. In each bearing member 155 is rotatably mounted on shaft 156 a sprocket wheel 157, the teeth of which engage with the parallelly arranged troughs and support such troughs and the lower reach of the endless conveyor chains 150, as clearly shown in Fig. 20. Secured to the shaft 145 adjacent one end thereof is a driving ratchet and a holding ratchet 159. Pivotally mounted on such shaft 145 adjacent such ratchets is a crank arm 160. Pivotally mounted on the crank arm 160 is a spring pressed driving pawl 161, which engages with the driving ratchet 158 so as to rotate the shaft 145 in a clockwise direction, as viewed in Fig. 23, and tending to drive the endless conveyor chains 150 and, therefore, the parallelly arranged troughs in the direction of the arrow shown in such figure.

The manner in which the crank arm 160 is operated to cause this driving operation will be hereinafter described.

Secured to the lower face of the framework 143 is a channel iron 162 and secured to the channel iron 162 and to one of the uprights 142 is a plate 163. Secured to the plate 163 by the bolts 164 and spaced apart from each other to define a guideway are members 165 and in such guideway is slidably mounted a member 166. One end of such member 166 is provided with a tooth 167 adapted to engage with the holding ratchet 159 and prevent overrun of the shaft 145 when the same is driven by the driving pawl 161. Plates 168 secured to the members 165 by bolts 169 and extending across the slot formed by such members 165 maintain the member 166 in the aforesaid guideway while permitting sliding movement of such member therein. Secured to the plate 163 by screw 170 is an angle member 171 through which protrudes as a sliding fit a rod 172 secured to and extending outwardly from the member 166. On the rod 172 between the angle member 171 and the end of the member 166 is a helical spring 173 which urges the member 166 to the left as viewed in Fig. 23 and tending to force the tooth 167 into engagement with the teeth of the holding ratchet 159. Extending laterally outward from the member 166 adjacent the tooth 167 is a shaft 572 and on such shaft is rotatably mounted a roller 573. Formed on the arm 160 is a cam 174 which is adapted to engage with the roll 573 and forces the member 166 to the right, as viewed in Fig. 23 against the tension of the spring 173 and thus freeing the tooth 167 from the ratchet 159.

Therefore, as the arm 160 is rotating in a clockwise direction, the cam 174 will, by engaging the roll 573, release the tooth 167 from the holding ratchet 159 and permit the driving pawl 161 to rotate the shaft 145 in a clockwise direction through the desired extent, thus moving the endless conveyors 150 in the direction of the arrow shown in such Fig. 23. Rotatably mounted on the shaft 145 is a plate 175 having formed integral therewith at one end an arcuate plate 176, which acts as a mask for the teeth of the driving ratchet 158, and which mask, when interposed between the driving pawl 161 and the teeth of such ratchet 158 will prevent the driving pawl from functioning. Pivotally attached to the other end of the plate 175 is the lower end of the connecting rod 176 and the upper end of this connecting rod is pivotally attached at the point 177 on an arm 178, one end of this arm being pivotally attached to the lower end of the rod 179 that extends upwardly from a framework to be hereinafter described.

The mechanism for operating the member 175 and the driving pawl 161 and the manner in which the same operates will be hereinafter described.

The uprights 142 adjacent the shaft 145 are extended upwardly and secured to such uprights in any suitable manner and extending rearwardly therefrom, so as to lie over the pallets 25 and the framework 10 that supports the same, is a horizontal rectangular framework 180 and the outer or rear end of this frame is supported on spaced uprights 181. Secured to the framework 180 are pairs of aligned bearings 182 and 183. In the pair of aligned bearings 182 is rotatably mounted a shaft 184, while in the aligned bearings 183 is rotatably mounted a shaft 185.

The shafts 184 and 185 are arranged parallel to each other and with the shaft 145 of the collecting table above described and lie parallel with the upper reach of the endless conveyor chains 25. Secured to the shaft 184 and spaced apart from each other are sprocket wheels 186 and these sprocket wheels are in alignment with corresponding sprocket wheels 187 secured in a similar manner to the shaft 185. Over the aligned sprocket wheels 186 and 187 run endless conveyor chains 188. Pivotally secured to the endless conveyor chains 188 at suitable points along the length thereof are arms 189. The members 189 extend laterally outward from the endless conveyor chains 188 and have secured at their outer ends a push-off bar 190. Such push off bar is preferably made of angle iron, as clearly shown in Figs. 17 and 18, and the engaging face of such push-off bar is provided with slots or grooves 191 along the length thereof, for a purpose to be hereinafter described. Associated with the laterally extending members 189 and with the endless conveyor chains at suitable points along the length thereof are mounted pulleys or rolls 192. With each pair of laterally extending members 189 is associated a surrounding bracket 193, there thus being one bracket 193 at each end of the push-off bar 190. In each bracket 193 is rotatably mounted on shaft 194 and at each end thereof a roller 195. Also, there is secured to each end of the push-off bar 190 by bolt 196 a bracket 197 in which is rotatably mounted a roller 198. As part of the frame 180 are longitudinal members 199 supporting spaced transverse channel iron members 200 and on the transverse members 200 and depending downwardly therefrom, while associated with each of the endless conveyors 188, are supporting brackets 201.

To each of the supporting brackets 201 are secured parallelly arranged members 202 that constitute combined cam surfaces and tracks and these tracks lie parallel to, above, and extend transversely of the pallet conveyors 25, as clearly shown in Fig. 16 and the track members 202 are so arranged as to have push-off bars 190 engage with the bricks 37 on the pallets 36 and will act to push such bricks off the pallet on rotation of the shaft 184 and 185. The under edge of the upper bar 202 and the upper edge of the lower bar 202 act as a track to receive the pulleys 192 and thus force the laterally extending members 189, and, therefore the push-off bars 190 to travel in a horizontal plane parallel to the plane in which lies the top surface of the pallets 36. The rolls 195 on the brackets 193 engage with the under edge of the under bar 202 and prevent the laterally extending members 189 from rotating about their connecting point with the endless conveyor chains 188 as a fulcrum.

Secured to the top of the frame 180 is a bracket or platform 203 on which is mounted a motor 204 for driving the push off mechanism and collecting table and all devices associated therewith. Mounted on the frame 180 are aligned bearings 205, which bearings are also in alignment with the drive shaft of the motor 204. Rotatably mounted in the aligned bearings 205 is a shaft 206 and connecting the shaft 206 and the drive shaft of the motor 204 is a magnetic clutch 207. The shaft 206 rotates in the direction of the arrow shown in Figs. 13 and 14, for example, and secured to such shaft is a pinion 208.

This pinion meshes with and drives a gear 209 secured to a shaft 210 that is rotatably mounted in bearings 211 on the frame 180. Also secured to the shaft 210 is a pinion 212 that meshes with and drives a gear 213 secured to a shaft 214 rotatably mounted in aligned bearings 215 secured to the frame 180. To one end of the shaft 214 is secured a crank plate 217, this crank plate 217 being provided with a crank pin 218 to which is pivotally attached the upper end of a crank arm 219, the lower end of this crank arm 219 being pivotally attached to the outer end of the crank arm 160 which is pivotally mounted on the shaft 145. Rotative movement of the shaft 214 will, therefore, cause an oscillating movement of the crank arm 160 and an intermittent rotary movement of the shaft 145 through the driving ratchet 158 and driving pawl 161. Secured to the shaft 214 at the end remote from the gear 213 is a bevelled gear 220 which meshes with and drives a corresponding bevelled gear 221 secured to one end of the shaft 222 that is rotatably mounted in bearings 223 secured to the frame 180, such shaft extending at right angles to the shaft 214. Secured to the framework 141 is a member 224 in which is secured a shaft 225 and on such shaft is pivotally mounted a bell crank lever, one arm 226 of which extends outwardly, as clearly shown in Fig. 26, and this arm at the point 227 has pivotally attached thereto the lower end of the connecting rod 228, the upper end of this connecting rod 228 being rotatably mounted on a crank pin 229 secured to or formed integrally with the crank hub 230 that is secured to the end of the shaft 222.

As the shaft 222 rotates, therefore, an oscillating movement is imparted to the bell crank lever above described. 231 and 232 designate parallelly arranged shafts secured to the frame 180 by members 233. These shafts 231 and 232 also lie perpendicular to the shaft 214 and extend outwardly from the frame 180. Rotatably mounted on the shaft 231 and extending downwardly therefrom and laterally thereof is an arm or lever 235, which is pivotally mounted at its lower end on a shaft 236 secured in ears 237 formed integral with an evening plate 238. On the shaft 232 is rotatably mounted an arm or lever 239 which extends downwardly therefrom and substantially parallel to the arm or lever 239 and this arm or lever 239 is pivotally mounted at its lower end on a shaft 240 secured to ears 241 formed integral with the evening plate 238. As the levers or arms 235 or 239 oscillate on the shafts 231 or 232 respectively, a reciprocating motion is imparted to the evening plate 238 and in a substantially horizontal plane. Rotatably mounted on the shaft 231 between the lever or arm 235 and the securing member 232 and extending downwardly therefrom is an arm or lever 242, and the other end of this lever is pivotally mounted on an ear 245 formed integral with the evening plate 238. Formed in the arm or lever 242 intermediate the ends thereof is an opening 246 through which extends a shaft 247 and on such shaft is pivotally mounted one end of a connecting rod 248. The other end of this connecting rod is pivotally attached at 249 to the other arm 250 of the bell crank lever above referred to. Therefore, as the shaft 214 rotates an oscillating movement is imparted to the bell crank lever comprised of the arms 246 and 250.

An oscillating movement is imparted to the arms or levers 235, 239 or 242 and consequently there is imparted to the evening plate 238 a reciprocatory motion transversely of the collecting table composed of the endless chain conveyors 150 and the angle irons 152. The inner edge of the evening plate 238 is composed of the series of steps 251, the width of such steps being substantially equal to the width of the space between adjacent angles 152 on the collecting table and the faces of such steps are provided with resilient covering members 252. As the collecting table moves intermittently step by step, a corresponding intermittent reciprocatory motion is imparted to the evening plate 238 and the steps 251 of such evening plate engaging with the end bricks of the rows of brick 37 on the collecting table will move such brick to the left, as viewed in Fig. 25, gradually closing up the space between such brick and until after the brick 36 have passed beyond the influence of the evening plate, all such brick are crowded together and adjacent one end of the troughs in the collecting table.

From an inspection of the construction shown in Figs. 13, 14 and 23 and 26, it will be obvious that for each complete rotation of the shaft 214, there will be one forward step of the collecting table shown in Fig. 23 and also that there will be one complete reciprocation of the evening device 238 shown in Fig. 26. Further, it will be obvious that as the collecting table is moving onward during a half revolution of the shaft 214, the evening plate 238 is moving outwardly with respect to the bricks 36, as viewed in Fig. 25.

During the next half revolution of the shaft 214, the collecting table is at rest and the effective stroke of the evening plate 238 is taking place.

Secured to the shaft 214 adjacent the gear 213 is a pinion 253 which meshes with and drives a gear 254 attached to the shaft 255 rotatably mounted in bearings 256 secured to the frame 180. Secured to the shaft 255 is a pinion 257 which meshes with and drives a gear 258 secured to the shaft 185, which is the driving shaft of the push-off mechanism shown in Figs. 14 and 15, for example. As the shaft when connected to the driving motor 204 is rotated at a uniform speed, the shaft 185 will be likewise rotated at a uniform speed, although the evening device 238 is intermittently reciprocated and also the collecting table is intermittently driven. The motor 204 for driving the push-off and collecting table is connected by conductors 259 and 260 to the double pole manual switch 261 and such switch 261 is connected by conductors 262 and 263 to the feed lines 136 and 127 respectively. The feed lines 136 and 127 are connected to a main line 264 by the double pole switch 265. The magnetic clutch 207 is connected to a magnetic brake mechanism 266 and also to contacts 267 and 268 of magnetic switches 269 and 270 respectively. The switches 269 and 270, therefore, control both the magnetic clutch 207 and the magnetic brake 266 and both such switches must be energized in order that a circuit may control the clutch and brake respectively. The magnetic switch 269 is controlled by a circuit extending from the main line conductor 127, conductor 272, switch 273, conductor 274, conductor 275, energizing winding of the magnetic winding 279, conductor 276 and conductor 277 to conductor 136.

The switch 273 is a normally open switch and is momentarily closed by a cam 279 attached to the shaft of the No. 8 pair of stop fingers. The magnetic switch 270 is controlled by a circuit from main line conductor 136, conductor 277, the energizing winding of magnetic switch 270, conductor 280, switch 281, conductor 282, hand switch 283, conductor 284, hand switch 285, and conductor 272 to a main line conductor 127. The switch 281 is normally closed and is intermittently opened by a counting mechanism associated with the collecting table and to be hereinafter described.

The switch 281 being normally closed and if the hand switches 283 and 285 are closed, the operating circuit for the magnetic switch 270 is likewise closed and such magnetic switch will attract its contact points 268 and 286. Therefore, when the No. 8 pair of stop fingers is engaged by the eighth pallet of brick 36, the cam 279 will momentarily close the switch contacts 273, completing the energizing circuit for the magnetic switch 269, which thereupon attracts its contact points 267, 287 and 288. By the operation of the magnetic switches 269 and 270, there are formed several holding circuits, one for each of the magnetic switches. The holding circuit for the magnetic switch 269 may be traced from conductor 272, conductor 289, contact 287, contact 288, conductor 290, switch 291, conductor 292, the energizing winding of the magnetic switch 269, conductor 278, conductor 277 and to the main line conductor 136. Therefore, no matter what may happen to the normally closed switch 273, the energizing winding of the magnetic switch 269 will be maintained.

The holding circuit for the magnetic switch 270 may be traced from conductor 272, conductor 289, contact 287, contact 267, magnetic clutch 207 and magnetic brake 266, contact 268, contact 286, energizing winding of the magnetic switch 270, conductor 280, switch 281, conductor 282, switch 283, conductor 284, switch 285, and conductor 277 to main line conductor 136.

Secured to the shaft 184 is a pinion 293 which meshes with and drives a gear 294 secured to a cam shaft 295 that is rotatably mounted in suitable bearing members 296 secured to the framework 180. Secured to the cam shaft 295 is a cam 297 which operates the magnetic switch 291 and controls the energizing circuit for the magnetic clutch 207 and the magnetic brake 266. The train of gears 293 and 294 is so proportioned that the cam shaft 295 will make one complete revolution for each half cycle of the push-off mechanism and the parts are so proportioned that one of the push-off bars 190 will have operated to push a complete row of brick 37 from a pallet 36 onto the collecting table and when this push-off operation is completed, the cam 297 operates to control the switch 291 and throw the magnetic clutch 207 out of operation.

Interposed between the ends of the pallet 36 and the collecting table is a brick slide 297a and onto which the brick 37 are pushed in their passage from the pallets 36 to the collecting table. As there is considerable friction between the brick 37 and pallet 36, we have provided means for preventing movement of the pallets during the time that the brick 37 are being pushed therefrom.

Secured to the uprights 13 of the rectangular framework 10 are aligned bearing members 298 and in these bearing members is rotatably mounted a shaft 299. Secured to the shaft 299 and extending upwardly therefrom are arms 300, there being one less of said arms 300 than the number of pallets 36 as arranged to have the brick 37 pushed off therefrom. As the push-off bars 190 move over the pallets 36 in the transferring operation of the bricks 37 and as the arms 300 extend above the upper face of the pallets 36, it was found necessary to provide the keyway portions 191 in the push-off bars. Secured to the shaft 299 and extending downwardly therefrom is a lever 301, to the lower end of which is pivotally attached one end of the connecting rod 302. The other end of this connecting rod is pivotally attached to the lower end of the lever 303 that is pivotally mounted intermediate its ends in a bearing 304 secured to the uprights 181. At the upper end of the lever 303 is a roller 305 adapted to be engaged by a cam 306 secured to the cam shaft 295, which cam shaft rotates in the direction of the arrow shown in Fig. 14. Above the bearing 304 and to the lever 303 is attached one end of a spring 307 and the other end of this spring is connected by any suitable means to one of the channel irons 200 of the push-off apparatus frame. The cam 306 engaging with the roller 305 attempts to rotate the lever 303 in a counter-clockwise direction about the pivot point thereof or so as to rotate the shaft 299 to move the upper end of the arms 300 to the left, as viewed in Fig. 14, and when the roller 305 is not engaged by the cam 306, the spring 307 tends to force the upper end of the arms 300 to the right, so as to allow the pallets 36 to move into the position adjacent the brick slide 297a as clearly shown in Fig. 15 or Fig. 23, and thus facilitate the passage of bricks from the pallets to the collecting table.

Secured to the frame 180 is a bearing 308 and in this bearing is rotatably mounted a shaft 309. Secured to the frame 180 are aligned bearings 310 and in such aligned bearings is rotatably mounted a shaft 311 that is arranged parallel to the shaft 309. Secured to the shaft 309 and depending downwardly therefrom is a link 312 and secured to the shaft 311 and depending downwardly therefrom is a link 313, this link being similar to the link 312. Pivotally attached to the lower ends of the links 312 and 313 is a bar or track 314 which bar or track is adapted to be engaged by the roller 195 carried in the frame 193 that is attached to the push off bars 190. Secured to one end of the shaft 311 is a slide 315 and in this slide is slidably mounted one end of the lever 178. As above described this lever is pivotally attached to the lower end of the rod 179 that is slidably mounted in the frame 180 for vertical movement therein. Also, and above described, there is pivotally attached to the lever 178 the upper end of the connecting rod 176, this connecting rod being pivotally attached at its lower end to the member 176. As the push-off mechanism starts in operation to push brick 37 off the pallets 36 and into the trough of the collecting table, it is essential that the collecting table be allowed to move forward step-by-step and, therefore, as the roll 195 engages with the track or bar 314, the member 176 is moved out from between the ratchet 158 and the driving pawl 161. When the push-off bar 190 has reached the end of the stroke and the roll 195 has ridden off the bar or track 314, the mask or shield 176 of the member 175 will again be moved into position between the driving ratchet 158 and the driving pawl 161, thus bringing the collecting table to rest.

During this movement of forcing the brick 37 off the pallets 36 and into the collecting table the cam 306 will be out of engagement with the roller 305 on the lever 303, and therefore the spring 307 will rotate this lever 303 and bring the arms 300 over to the right, as viewed in Fig. 14 into engagement with the edge of the brick slide 297a. As the brick 37 are moved on the pallets 36 the pallets will slide to the right, as viewed in such Fig. 14, and will be brought to rest against the arms 300 and, therefore, closing up the gap that ordinarily exists between the end of the pallets 36 and the edge of the brick slide 297a. This closed-up position of the pallets 36 and brick slide 297a is clearly shown in Fig. 16. After the brick 37 have been moved off the pallets 36, the cam shaft 295 will have rotated so as to bring the cam 306 thereon into engagement with the roll 305 on the lever 303, which will, therefore, be rotated so as to cause a rotation of the shaft 299 and a movement of the arms 300, which causes a movement of the pallets 36 back into their original position or in the position shown, for example, in Fig. 14. On the shaft 148 of the collecting table shown in Figs. 20, 21, and 22 is secured a stub shaft 315 on which is rotatably mounted a pinion 316. This pinion is provided with an arcuate groove or slot 317 in which extends a pin 318 secured to the end of the shaft 148 and parallel to the axis of such shaft. This construction permits a limited rotary movement of the pinion 316 on the stub shaft 315 with relation to the shaft 148. Secured to and extending laterally outward from the frame members 142 is a shaft 319 and on this shaft is rotatably mounted a gear 320 which meshes with and is driven by the pinion 316.

Figure 34:
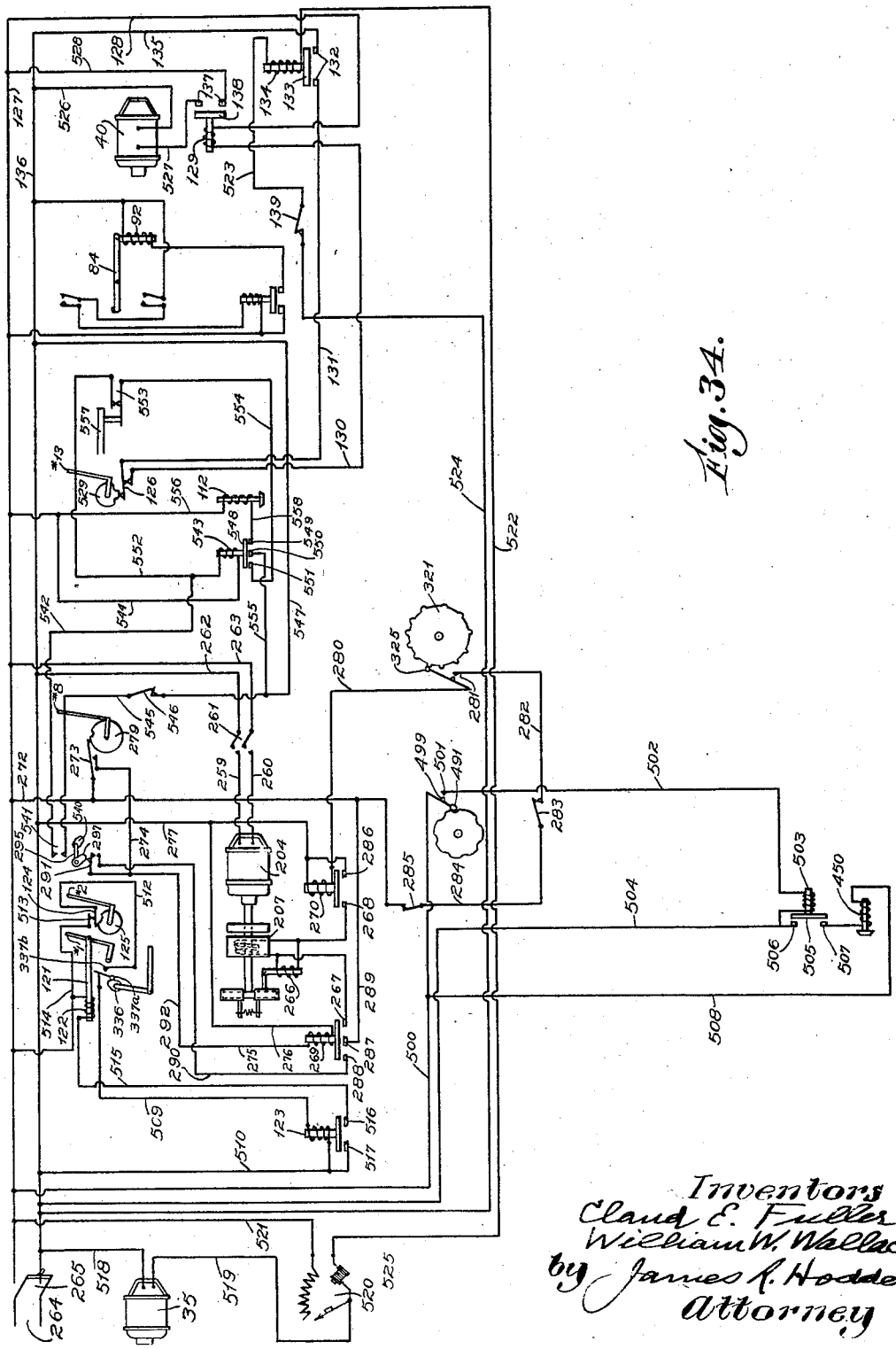
Fig. 34 is a circuit layout of the various electrically operated and operating devices associated with the mechanism.

Also on the shaft 319 concentric with the gear 320 and adjustable on such shaft with respect to the gear 320 is an index wheel or plate 321 provided at intervals about its periphery with projections or cams 322. Secured to one of the longitudinally extending members 143 is a bracket or support 323 on which is secured a switch 281, such switch having an operating lever 325 that is adapted to be engaged by the projections 322 as the index wheel or plate 321 is rotated. The projections 322 on the index wheel or plate 321 are set to operate the switch 281, which is a normally closed switch, when the required number of rows of brick 37 have been positioned on the collecting table. By referring to Fig. 20 it will be seen that the top of the collecting table is now filled with brick and that at this instant the switch 281 is being operated by the lever 325 thereof, being engaged by a projection 322 on the index wheel or plate 321. The switch 281 is, therefore, open and referring to the circuit diagram in Fig. 34, it will be obvious that the opening of the break points in the switch will cause a de-energization of the magnetic switch 270 and the holding circuit for the magnetic clutch will be broken at the contacts 268 and 286. The power will, therefore, be shut off from the push off mechanism and the collecting table driving mechanism and both the push-off mechanism and the collecting table will be brought to rest. It will be noted that the index wheel or plate 321 has nine regular spacings, each of which represent twenty-four brick on the receiving table and two spacings, which represent twenty rows of brick on the receiving table.

When the index wheel or plate 321 is properly set the receiving table will be stopped twice with twenty rows of brick in position to be lifted therefrom and will then stop nine times with twenty-four rows of brick in position. This represents a complete cycle, which is repeated indefinitely.

Referring to Fig. 19 it will be obvious that as the pallets 36 have been moved to the left in such figure they will have engaged with the brick stop 331 and thus rotated the shafts 327 and 328 in a clockwise direction. After the last brick 37 on the pallets 36 has been pushed off therefrom by the pushing bar 190, the weight 333 will rotate the shafts 327 and 328 in a counterclockwise direction.

This will move the brick stop 331 to the right, as viewed in such Fig. 19, or into position to be engaged by the next oncoming pallet of brick 37. Secured to the cam shaft 295 is a cam 540 which closes a normally open switch 541 momentarily. One contact of the switch 541 is connected by conductor 542 to one end of the energizing winding of the relay switch 543 and the other end of this relay switch is connected by conductor 544 to the main line conductor 127. The other contact of the switch 541 is connected by conductor 545 to a manual switch 546 and this switch is also connected by conductor 547 to the main line conductor 136. The closure of the circuit for the relay switch 543 by the switch 541, and assuming the manual switch 546 to be closed, causes such relay switch 543 to bring the armature 548 thereof into engagement with contacts 549, 550 and 551 respectively. There is, therefore, a holding circuit for the magnetic switch 543 closed from main line conductor 127, conductor 544, the energizing winding of relay switch 543, conductor 552, the normally closed switch 553, conductor 554, contact 551, armature 548, conductor 555, conductor 547 to main line conductor 136. Switch 541 being momentarily closed is now assumed to be open and the holding circuit above described maintains the relay switch 543 in energized position. Also a circuit is closed from main line conductor 127, conductor 556, solenoid 112, conductor 558, contact 549 and armature 548, contact 550, conductors 555 and 547 to the main line conductor 136.

The energization of the solenoid 112 causes the operation of the air valve 109, which controls the air from the source of air supply 111, to control the air cylinders 106 which will cause a downward movement of the carriage or bridge 95. The depression of the bridge 95 releases all of the stop fingers 116 from any pallets 36 resting on the pallet conveyor 25. Secured to the bridge 95 is a switch arm 557 which, when the bridge 95 is in its lowermost position, opens the normally closed switch 553, thus breaking the holding circuit for the relay switch 543, and the energizing circuit for such relay switch 543 being already broken at the normally open switch 541, such relay switch de-energizes and allows the armature 548 thereof to move out of engagement with the contacts 549, 550, and 551 and the counterweights 103 move the bridge 95 back into its uppermost position with, however, the pairs of stop fingers 116 in their lowermost position.

As the pallet conveyor 25 is constantly operated any pallets thereon which were held against movement by the members 9 to 15 inclusive of the stop fingers 114 will be permitted to move onward and the first pallet 36 will strike against the brick stop 331, closing in the manner above described, the circuit for the solenoid 122 to bring the first stop finger 116 into elevated position.

Also, when the first pallet 36 has engaged with the first stop finger, the friction thereof will be sufficient to maintain the first stop finger in its uppermost position and, therefore, as there is no need to maintain the solenoid 122 energized, the cam 125 has been placed on the shaft of the second stop finger so that when the second stop finger is engaged by a pallet 36 the normally closed controlling switch 123 will be operated to break the circuit for the solenoid 122.

The collecting table has, of necessity, been stopped in position where the arm 325 of the switch 281 is engaged by one or the other of the projections 322 on the index plate or wheel 321. The mechanism for again permitting the starting of the device by initiating the operation of the switch 281 is associated with the lifting or unloading mechanism and will be hereinafter described.

The uprights 181 are extended upwardly and have secured at their top ends a channel iron 340. The uprights 142 on the base 141 are likewise extended upwardly and have secured at their top ends a channel iron 341. The upper surface of the channel irons 340 and 341 lie in the same plane and supported on such channel irons 340 and 341 are pairs of parallelly arranged channel irons 342 and also a channel iron 343 that is arranged parallel to the pairs of channel irons 342. The pairs of channel irons 342 are spaced apart from each other and form parallel tracks on which run wheels 344, these wheels being arranged in pairs on shafts 345 and such shafts are rotatably mounted in bearings secured to a rectangular frame or base 346.

The ends of the channel irons 342 and 343 at the end remote from the cross channel iron 340 are secured together top and bottom by cross channel irons 347 and 348 respectively. Adjacent the channel iron 348 is a cross beam 349 which supports this end of the channel irons 342 and 343, the member 349 being, in turn, supported by an angle iron standard 350. Secured to the top surface of the channel irons 342 and 343 adjacent the end thereof above the cross channel members 340 and 341 are cross members 351 and 352, these members 351 and 352 supporting the ends of an air cylinder 353. Supported on the cross members 351 and 352 or extentions thereof and above the air cylinder 353 is an oil cylinder 354. Within the air cylinder 353 is the usual piston (not shown) and attached to such piston is a piston rod 355. The piston rod 355 extends through one end of the air cylinder 353 and is attached at the point 356 to a bracket 357 at one end of the rectangular frame 346. Secured to the channel member 343 by clips 358 is an air pipe 359 that extends to the source of air supply 111. In such pipe 359 is a manually controlled valve 360 connected by pipe 361 to a three-way valve 362. Such valve 362 is connected by pipe 363 to one end of the air cylinder 353 and by pipe 364 to the other end of such air cylinder. Forming part of the valve 362 is an operating lever 365 and pivotally attached to the lower end of the lever 365 is a connecting rod 366. Rotatably mounted in bearings 367 on the channel members 342 and 343 is a shaft 368 and secured to such shaft is a crank 369. Pivotally attached to the outer end of the crank 369 is one end of the connecting rod 366.

Secured to the shaft 368 is a lever 370 which extends downwardly so as to be within easy reach of an operator who desires to manually control the three-way air valve 362. Also secured to the shaft 368 is a lever 371, this lever being provided at its outer end with a roller 372 adapted to be engaged by mechanism to be hereinafter described and which will automatically control the three-way valve 362.

From the above description it is obvious that an operator, by properly manipulating the valve control lever 370 may move the rectangular frame 346 along the tracks 342 and in either direction. Associated with the oil cylinder 354 is the usual piston (not shown) and to which is attached one end of a piston rod 373. The other end of this piston rod is connected to the bracket 357 on the rectangular frame 346 at the point 374. Connecting each end of the oil cylinder 354 is an oil pipe 375, communicating through a valve 376 with an open-ended oil overflow tank 377. Intermediate the ends of the oil cylinder 354 there are tapped holes connected together by a pipe 378 and such pipe 378 communicates, by pipe 379, with a pipe 375 and with the oil overflow tank 377. Interposed in the pipe 375 are speed regulating devices 380 for regulating the rapidity of the flow of oil from one end of the cylinder 354 to the other.

At each corner of the rectangular frame 346 are erected standards 381 joined together at their top ends by angle members 382 and braced against movement by diagonal braces 383. Secured to the members 382 or to supporting devices carried thereby is a head 384, to the under side of which is secured the upper end of a pair of concentrically arranged piston rods 385 and 386.

These concentrically arranged pistons are centrally arranged with respect to the standards 381 and extend downwardly between such standards and through the central point of the rectangular frame 346 to any suitable distance. The hollow piston rod 386 is not only supported by the head 384 but extends upwardly to the upper end thereof and has supported on its upper end a valve 387. This valve 387 is connected by pipe 388 to a T 389 secured to a bracket 390 on one of the standards 381 and one end of such T is connected by pipe 391 to the source of air supply. The other end of the T 389 is connected through a valve 392 and pipe 393 to the head 384 and communicates with the cylindrical piston rod 385. Associated with the valve 387 is an operating lever 394 and by means of which air flowing through the pipe 391 from the source of air supply 111 may be admitted to or shut off from the hollow piston rod 386, such air, however, always communicating with the interior of the hollow piston rod 385. Above the upper end of the valve 387 and usually forming part of the structure of the building in which the machine is housed are cross beams 395, to the under side of which is secured channel members 396. The channel members 396 are spaced apart from each other and to the lower surface of each of the channel members 396 adjacent the ends thereof are arranged cross members 389. Secured to such cross members and in alignment with each other are bearings 399 in which is rotatably mounted the shaft 400. Secured to the shaft 400 adjacent either end thereof are pairs of radially extending arms 401, these arms being arranged in pairs and connecting each pair is a shaft or rod 402 and therefore the rods 402 lie parallel to the shaft 400.

Also secured to the shaft 400 and extending radially outward therefrom is a lever 403 to the outer end of which is pivotally attached one end of a connecting rod 404. The other end of the connecting rod 404 is pivotally attached to one arm of a bell crank lever that is rotatably mounted on a shaft 406 located at the lower end of a bracket 407 that is secured to the under side of one of the cross braces 395. The other arm 408 of the bell crank lever has pivotally attached thereto the upper end of the connecting rod 409. This connecting rod extends downwardly and terminates at a point adjacent to the floor or base of the machine and is pivotally attached to one end of the lever 410. The other end of this lever is secured to a shaft 411 rotatably mounted in a bracket 412 fixed to the foundation or base of the machine and also secured to the shaft 411 is one end of a lever 413 for operating the entire mechanism. It will be obvious that by manipulating a lever 413, the operator may rotate the shaft 400 through the linkage above described and thus bring one or the other of the shafts 402 into engagement with the operating lever 394 of the valve 387 and this regardless of the position of the rectangular frame 346 along the tracks 342. Therefore, it will be obvious that the operator may, by manipulating the control lever 370, move the rectangular frame 346 along the tracks 342 and at any point thereof, by manipulating the lever 413, he may operate the valve 387.

Rotatably mounted in the rectangular frame 346 is a supporting cylinder 414, in which is slidably mounted an air cylinder 415. This air cylinder 415, while slidably mounted in the supporting cylinder 414, is fixed against rotation with respect thereto. Within the air cylinder 415 fits a piston 416 secured to the lower end of the cylindrical piston rod 385. At the lower end of the hollow piston rods 385 and 386 and between the same is secured a sleeve 417 which not only acts as a spacing member for the hollow piston rods 385 and 386 but prevents the passage of any fluid from the space between the hollow piston rods into the cylinder 415 below the piston 416. The outer hollow piston rod 385 is provided, adjacent the upper surface of the piston 315, with a plurality of radially extending holes 418 and through which fluid may flow to the inside and outside of the hollow piston 385. At the top of the air cylinder 415 is a stuffing box 419 and which will prevent leakage of air or other fluid from the interior of the cylinder 415 outward to the atmosphere. Secured to the bottom end of the air cylinder 415, and such bottom end is closed, is a rectangular framework 420 to which is secured a brick pickup device 421, similar to the pickup device described and claimed in Patent No. 1,510,886 dated Oct. 7, 1924, and granted to C. E. Fuller.

Secured to the cylindrical supporting member 414 adjacent the top surface of the rectangular frame 346 is a bevelled gear 423, which meshes with and is driven by a bevelled gear 424 secured to the horizontal shaft 425 that is rotatably mounted in aligned bearings 426 supported on the rectangular framework 346.

Secured to the outer end of the shaft 425 is a radially extending member 427 provided on each side on the outer end thereof with adjusting devices 428, such adjusting devices defining between them a passageway. Rotatably mounted on the end of the shaft 425 is a lever 429 which passes between the adjusting devices 428 and has rotatably mounted on its outer end a roller 430. The relative position of the lever 429 with respect to the bevelled gear 424 is adjusted by means of the adjusting devices 428. On the top surface of the channel member 343 is secured a bearing block 431 and in this bearing block 431 is pivotally attached an elongated frame including a pair of spaced parallelly arranged angle members 432 joined together at the end remote from the bearing member 431 by a plate 433 and between the track members 432 runs a roller 430 above described as being rotatably mounted on the outer end of the lever 429. Secured to the angle members 432 is a plate 434 and to the lower end of such plate is connected one end of the chain 435, the other end of this chain being attached to a bolt 436 on the channel member 343. This chain 435 limits the upward movement of the ends of the angle members 432 adjacent the plate 433. Mounted on the channel member 343 and the parallelly arranged track members 342 is an angle iron 437, to which is secured by bolts 438 a plate 439 and secured to this plate 439 is a vertically arranged air cylinder 440, in which works the usual piston (not shown) and connected to such piston is the usual piston rod 441. Secured to the outer end of the piston rod 441 is a forked member 442 provided at its upper end with a shaft 443 on which is rotatably mounted a sprocket wheel 444.

Secured to the end plate 433 that is attached to the track angles 432 is one end of a link 445 and the other end of this link is attached to one end of a sprocket chain 446. This sprocket chain 446 passes over the sprocket wheel 444 and has its other end attached to a bolt 447 secured to the channel member 347. Secured to one of the standards 350 is a plate 448 on which is mounted an air valve 449 operated by a solenoid 450. One end of the air valve 449 is connected by pipe 451 to the lower end of the air cylinder 440 and the other end of this air valve 449 is connected by pipe 452 to a valve 453 that, in turn, connects with the air line 359. It will be obvious therefore that if the solenoid 450 is controlled in such a manner as to, in turn, control the air valve 449 to admit air through the pipe 451 to the air cylinder 440 beneath the piston contained therein that the piston rod 441 will be moved upwardly, carrying the sprocket wheel 444 therewith and that this will impart a rotary movement to the frame that includes the track channels 432 about the bearing 431 as a center. When the outer end of the track members 432 are in their uppermost position, it will be obvious that the space between such track members constitutes an inclined plane in which the roller 430 will move, if at this time the rectangular frame 346 is moved to the right, as shown in Fig. 27, for example, and will cause a rotary movement of the shaft 425 and a corresponding rotary movement of the cylindrical supporting member 414 and consequently a rotary movement of the air cylinder 415.

The incline at which the track angles 432 will lie when the outer ends thereof are in their uppermost position, are such that the air cylinder 415 will be rotated through an angle of ninety degrees and the purpose of this will appear as the description of the invention progresses.

Secured to the rectangular frame 420 and on opposite sides thereof are brackets 454 in each of which is rotatably mounted on shaft 455 a bell crank lever 456. Either one of these bell crank levers 456 is adapted to engage with the roll 372 rotatably mounted in the bracket 371 secured to the shaft 368. It will be remembered that the shaft 368 has secured thereto an operating lever 370 and by means of which the shaft 368 may be rotated to control the air valve 362 through the medium of the connecting rod 366. The operation of the air valve 362 will result in the control of the rams shown at the left of Fig. 27 and the rectangular frame 346 mounted on the walls 344 will move on the tracks 342 to the right of said Fig. 27. Also, as at this time, the lifting device 421 is in its uppermost position, the operator, by manipulating the control lever 314, will operate the valve 378 to bring the lifting device 427 to rest as far as upward or downward movement is concerned.

Extending downwardly from the longitudinally extending beams 343 are members 457, there being several of these downwardly extending members, and secured to the members is a guide plate 458. The main portion of the guide plate 458 lies in a vertical plane in which also lies the end wall of the pick up device 421 carrying the rows of bricks 37 to be picked up and the lower edge of such guide plate 458 is curved inwardly, as indicated at 459 to more readily engage with the end wall of the lifting device 421.

When the rectangular frame 346, therefore, has been moved to its extreme left hand position, as viewed in Fig. 27, one end of the lifting device 421 will be in practical engagement with the adjacent face of the guide plate 458 and the operator may thus know that the lifting device 421 is in proper position with relation to the rows of brick 37 on the collecting table 150. On the longitudinally extending members 143 of the framework for the collecting table are adjustably mounted brackets 460. There are thus two pairs of brackets 460, the members of each pair being in alinement with each other, and secured to each pair by bolts 461 are bars 462, these bars extending over the top of the collecting table and above the rows of brick 37. The opposing faces of the cross bars 462 also act as guide elements for the sides of the pick-up device 421 to guide the same into proper registry with the rows of brick 37, as clearly shown in Fig. 2, and to thereby guide the lifting fingers 463 of such lifting device 421 between the rows of brick 37, as clearly shown in Fig. 27. With each of the cross bars 462 is associated a spring pressed roll 464 which operates locking mechanism associated with the lifting fingers 463 so as to hold the lifting fingers 463 in open position on the downward movement of the lifting device 421, and allows such lifting fingers 463 to move into locking position during the preliminary lifting motion of the lifting device 421 so as to firmly grasp the brick 37 therebetween. The specific manner in which this lifting and locking action is carried out is clearly explained in the patent above referred to, and reference is hereby made to such patent for a clear description of the operation thereof.

As above explained, the collecting table is moved in unison with the push-off mechanism shown in Fig. 16, for example, and the collecting table will operate until, for example, the upper reach thereof is filled with rows of brick 37, as clearly shown in Fig. 20. On referring to this figure it will be noted that the extreme right-hand row of brick 37 is adjacent the right hand transverse bar 462 and that unless the plurality of rows of brick 37 now on the collecting table are picked up, that the next step of the collecting table will move the extreme right hand row of brick 37 so far to the right of such figure as to be beyond the vertical face of the transverse bar 462 and, therefore, in such position as not to be picked up by the lifting device 421. Referring further to Fig. 20, it will be noted that with the extreme right-hand row of brick in the position as shown that the operating roll 325 of the switch member 281 is in engagement with one of the cam members 322 on the cam 321 that is adjustably secured to the gear 320, such gear being in engagement with the pinion 316 on the end of the shaft 148. The engagement of the roll 325 by the cam member 322 broke the energizing circuit for the relay switch 270 at the point 281, as clearly shown in Fig. 34, and thus broke the energizing circuit for the magnetic clutch 207. Therefore, under the conditions that exist in Fig. 20, the push-off mechanism is inoperative and also the collecting table is at rest and will remain at rest until further operations take place.

Figure 2:
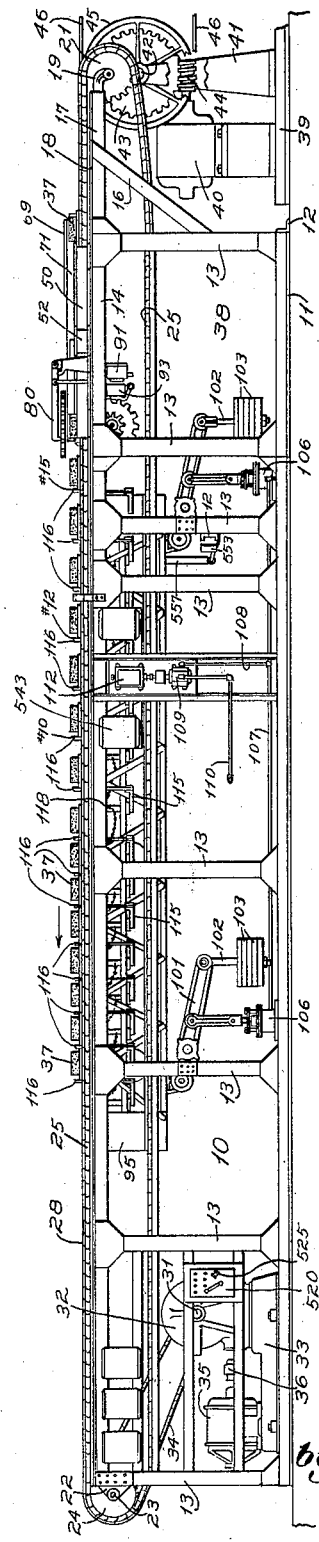
Fig. 2 is a side elevation of the machine shown in Fig. 1 and of the left hand side thereof.

The operator, by manipulating the lever 413, will so control the air valve 387 as to allow the lifting device 421 to move downwardly and in the position shown in Fig. 2, where the lifting fingers 463 are in engagement with the rows of brick 37, as clearly shown in Fig. 27. On one of the transverse bars 462 is rotatably mounted a shaft 466 and to this shaft is secured a laterally extending arm 467. Rotatably mounted on the free end of the arm 467 is a roll 468 adapted to be engaged by the lower surface of the lifting device 421, as clearly shown in Fig. 2. This engagement causes a rotation of the shaft 466 in a counterclockwise direction. Also secured to the shaft 466 and extending laterally outward therefrom is an arm or lever 469, and pivotally attached to the lower end of this arm or lever 469 is one end of a connecting rod 470. The other end of this connecting rod is connected to the lower end of a lever 471 secured to the shaft 472 rotatably mounted in bearings on a longitudinally extending frame member 143. Secured to the shaft 472 and extending laterally outward therefrom is a lever 473, the outer end of this lever being pivotally attached to the upper end of a connecting rod 474. The lower end of the connecting rod 474 is pivotally attached to a lever 475 at a point intermediate the ends of such lever. This lever 475 is pivotally mounted on the shaft 319 and its outer free end is attached to a yieldingly mounted guide arm or rod 476. Also, this lever 475 is provided with an adjustable weight 477 and which tends to rotate the lever 475 in a counterclockwise direction about the shaft 319 as a center.

Rotatably mounted on the lever 475 is a spring pressed pawl 478 adapted to engage with the gear teeth 320 as a ratchet and to rotate the gear 320 in a counterclockwise direction on proper rotary movement of the lever 475. When the lifting device 421 is lowered so as to have the lower surface thereof engage with the roll 468 on the lever 467 there is a clockwise rotary movement imparted to the lever 475 about the shaft 319 through the linkage 469, 470, 471, 473 and 474 and the spring pressed pawl is moved upwardly so as to engage with one of the teeth of the gear 320. Also, the weight 477 is moved upwardly and placed in such a position as to act as a means for rotating the lever 475 in a counterclockwise direction. Assuming, therefore, that the various elements are in the position shown in Fig. 20 and under these conditions it is assumed that because of the position of the operating switch 281, the magnetic clutch 207 is placed out of action and no further operation of the push-off device and collecting table is possible. The operator, therefore, in order to start the machine in operation will control the lever 413 so as to cause a downward movement of the pick-up device 421 and such downward movement, will, by engaging the lever 467, control various devices as above described. Immediately the operator, by manipulating the lever 413, causes an upward movement of the pick-up device 421, the weight of such pick-up device is removed from the lever 467 and, therefore, the weight 477 on the lever 475 will rotate the same in a counterclockwise direction and the pawl 478, engaging with the teeth of the gear 320, will rotate such gear through an angle determined by the length of the arcuate slot or groove in the pinion 316.

This will move the cam 322 out of engagement with the roll 325 and allow the switch 281 to again come into engagement and render possible the operation of the magnetic clutch 207. The entire device, therefore, is again started in operation. The spacing of the cams 322 on the cam plate 321 is such as to bring the push-off mechanism and collecting table to rest when the proper number of rows of brick 37 are in position to be engaged by the pick-up device 421 and particularly to arrange the first two rows or layers of brick on the transfer car to provide for making finger courses to enable the entire unit of brick to be lifted by a mechanical lifting fork.

Extending transversely of the length of the collecting table and leading to a kiln shed (not shown) are spaced tracks 480 and on these tracks run flange wheels 481 at either end of an axle 482. The axles 482 support a transfer car 483 and such transfer car is described and claimed in Patent No. 1,416,589, dated May 16, 1922, and granted to William W. Wallace.

By reference to such patent it will be seen that the top or deck of the transfer car is composed of a plurality of parallelly arranged independently movable members, such members ordinarily lying closely adjacent each other and which, however, may be divided into pairs, except the outer members, which are maintained single. On the parallelly arranged members are placed the finger courses of brick, and the finger courses are invariably two brick high. Therefore, it is necessary to place two layers or rows of brick on the deck of the transfer car prior to dividing such layers into parallelly arranged pairs of rows.

Obviously, such finger courses would constitute a less number of rows of brick than a full layer as distinguished from a finger course layer. The cam members 322 are so arranged, therefore, on the cam shaft 321 as to stop the operation of the push-off device and collecting table to provide for the collection of finger courses. Adjacent the right hand end of the channel irons 343 and downwardly depending therefrom are members 485, to one face of which is secured a guide plate 486, the lower edge of which is rounded, as indicated at 487 to form a guide. The guide plate 486 is similar to the guide plate 458 and acts as a guide or stop for the lifting device 421 so as to position the same over the transfer car 483. The operator now lowers the lifting mechanism 421 and deposits the layer of brick 37 on the transfer car 483.

Except for the first two layers of brick 37 deposited on the transfer car 483 every alternate layer of brick 37 is placed at right angles to the preceding layer and we have arranged mechanism for automatically bringing the turning device for the lifting element 421 into action. Mounted on the longitudinal channels 343 is a shaft 488 on which is placed a switch device 489. Forming part of this switch device 489 is a pivoted arm 490, provided with a roller 491 that is adapted to engage with a cam plate 492 secured to a ratchet 493 on a shaft 494. The shaft 494 is also secured to the longitudinal channel members 343. The cam 492, therefore, rotates with the ratchet 493. Secured to one corner of the rectangular framework 346 by bolt 495 is a bracket 496.

In this bracket 496 is mounted a shaft 497 and rotatably mounted on this shaft is a pawl 498, which pawl engages with and acts as a driving means for the ratchet 493. The lever 490 of the switch 489 has a contact 499 thereon that is connected by conductor 500 to the main feed line 127. Associated with the contact 499 is a contact 501 that is connected by conductor 502 to the energizing winding of a relay 503 and this energizing winding of such relay is also connected by conductor 504 to the main line conductor 136. The relay 503 is provided with an armature 505 adapted to engage with contacts 506 and 507. The contact 506 is connected to the conductor 504 and thus to the main line conductor 136. The contact 507 is connected to the solenoid 450 and this solenoid is also connected by conductor 508 to the conductor 500 and thus to the main line conductor 127. The cam 492 is so cut as to maintain the contacts 499 and 501 in engagement with each other or to permit said contacts to be out of engagement with each other and the length of time of the engagement or disengagement of these contacts is determined by the ratchet 495 and pawl 498. If we assume that the pick-up device 421 is in the position shown in Fig. 27, and that at this time the roller 491 is in engagement with the cam 492 in the position shown in Fig. 28, then the contacts 499 and 501 are out of engagement with each other, as clearly shown in Fig. 34. Under these circumstances the relay 503 cannot be energized and, therefore, the solenoid 450 will not be operated. The operator may, therefore, lower the lifting device 421 to the collecting table and pick up a layer of bricks therefrom, then lift the same upward so as to have one or the other of the arms 456 engage with the roller 372 and thus control the flow of air through the valve 362 to the air cylinder 353.

The rectangular framework 346 will be moved to the right in Fig. 27 and into position to deposit the layer of brick 37 onto the transfer car 483 as shown in Fig. 2. The operator will now manipulate the lever 370 to cause a return of the rectangular frame 346 to the left, as shown in Fig. 27, at which time the pawl 498 engaging with the ratchet 493 will rotate such ratchet through the space of one tooth and rotate the arm 490 so as to bring the contacts 499 and 501 into engagement with each other. The closing of the circuit at the contacts 499 and 500 will cause the operation of the relay 503 and the bringing into engagement with the contacts 506 and 507 of the armature 505. This latter operation will complete the energization of the solenoid 450 which operates to control the air valve 499 so as to allow air to pass into the air cylinder 440 and thereupon the piston rod 411 moves upwardly, causing an upward movement of the free end of the angle members 432 about the bearing bracket 431 as a center and the bearing angles 432 will remain in their uppermost position until the rectangular frame 346 has been moved to the right, as shown in Fig. 27 and Fig. 2 and back again. It is obvious that on the outward movement and as above described the rectangular frame 421 will be rotated through ninety degrees and thus position the rows of brick 37 at right angles to the preceding rows. When the rectangular frame 346 is returned to its initial position, as shown for example in Fig. 27, the pawl 498 will engage with the ratchet 493 and will rotate the same through a space of one tooth, again bringing the roller 491 into such a position with respect thereto as to allow the contacts 499 and 501 to separate from each other, thus breaking the circuit for the relay 503, which in turn breaks the circuit for the solenoid 450.

Having thus described our invention, what we claim as new is:—

1. In an apparatus for hacking bricks onto cars, the combination of a conveyor, means for constantly operating said conveyor, a second conveyor for delivering pallets of brick in succession to the first said conveyor, means for operating the said second conveyor, means associated with the first said conveyor for arresting the movement of pallets of brick in succession until a predetermined number has been collected, and means associated with the first said conveyor for arresting the movement of the second said conveyor after a predetermined number of pallets of brick have been delivered to the first conveyor.

2. In an apparatus for hacking bricks onto cars, the combination of a conveyor, means for constantly operating said conveyor, means for delivering pallets of brick in succession to said conveyor, a bridge associated with the conveyor and movable relatively thereto, means mounted on said bridge for arresting the movement of pallets of brick in succession until a predetermined number have been collected, means operable upon the collection of the predetermined number of pallets for moving the bricks from the pallets, and means for moving the bridge relatively to the conveyor to remove the arresting means from the pallets.

3. In an apparatus for hacking bricks onto cars, the combination of a constantly moving conveyor, a vertically movable bridge associated therewith, a plurality of pairs of stop fingers rotatably mounted on said bridge, means for delivering pallets of brick to the conveyor, means operable by the bricks on the first pallet for bringing the first pair of stop fingers into the path of movement of the first pallet of brick, connecting means between the pairs of stop fingers whereby the operation of a pair of stop fingers by a preceding pair of stop fingers will bring the succeeding pair of stop fingers into operative position to thereby arrest the movement of the next succeeding pallet of brick, and means for moving said bridge vertically with respect to said conveyor to remove said stop fingers from said pallets.

4. In an apparatus for hacking bricks onto cars, the combination of a constantly movable conveyor, means for delivering a succession of pallets of brick to said conveyor, a bridge associated with said conveyor, pallet arresting devices mounted on said bridge and operating to bring the pallets to rest in succession, and means operable after the stopping of the predetermined number of pallets for preventing the further delivery of pallets of brick thereto.

5. In an apparatus for hacking bricks onto cars, the combination of a constantly movable conveyor, an intermittently movable conveyor associated therewith and for delivering pallets of brick thereto, a collecting bridge associated with the first conveyor, means forming part of said bridge for stopping the movement of pallets of brick in succession until a predetermined number of pallets have been collected on the bridge, a brick removing device associated with the first conveyor and with the bridge, operating means therefor, controlling devices for said operating means operable by the last pallet of the predetermined number of pallets for initiating the movement of the brick removing means to remove the bricks from the pallets, and independent means associated with the bridge for controlling the operation of the intermittent conveyor after a predetermined number of pallets of brick have been fed to the first conveyor.

6. In an apparatus for hacking bricks onto cars, the combination of a device for collecting a plurality of parallelly arranged pallets of brick into a group of predetermined size, a brick removing device associated therewith and for removing the bricks from the group of pallets simultaneously, means for operating said brick removing device, a collecting table associated with said brick removing device, means associated with the brick removing device for intermittently operating the collecting table, and means for operating the brick removing means continuously during the intermittent operation of the collecting table, whereby the bricks removed from the pallets are collected into parallelly arranged rows on the collecting table.

7. In an apparatus for hacking bricks onto cars, the combination of means for collecting a group of pallets of brick, said bricks being arranged parallel to each other, a collecting table associated with the collecting means, an upedging device interposed between the ends of the collected group of pallets and the collecting table, a pushing device for pushing the bricks from the pallets, and operating means for the pushing means and for the collecting table to operate the same in unison and impart a continuous movement to the pushing device and an intermittent movement to the collecting table.

8. In an apparatus for hacking bricks onto cars, the combination of a collecting device for collecting a group of pallets of brick with the pallets arranged parallel to each other and with the brick on each pallet arranged parallel with each other and lying on the flat side thereof, a collecting table associated with the collecting device and provided with a plurality of parallelly arranged troughs, said troughs being arranged transversely of the length of the collected pallets and parallel to the length of the bricks on the pallets, a brick upedging device interposed between the ends of the collected pallets and the collecting table, means for intermittently moving the collecting table step-by-step to bring the parallelly arranged troughs in succession into registry with the delivery end of the upedging device, and means continuously operable during the intermittent movement of the collecting table for pushing the bricks off the pallets, whereby the bricks are upedged by the upedging device and delivered edgewise to the troughs in the collecting table.

9. In an apparatus for hacking bricks onto cars, the combination of a collecting device for collecting a group of pallets of brick with the pallets arranged parallel to each other and with the brick on each pallet arranged parallel with each other and lying on the flat side thereof, a collecting table associated with the collecting device and provided with a plurality of parallelly arranged troughs, said troughs being arranged transversely of the length of the collected pallets and parallel to the length of the bricks on the pallets, a brick upedging device interposed between the ends of the collected pallets and the collecting table, means for intermittently moving the collecting table step by step to bring the parallelly arranged troughs in succession into registry with the delivery end of the upedging device, means continuously operable during the intermittent movement of the collecting table for pushing the bricks off the pallets, whereby the bricks are upedged by the upedging device and delivered edgewise to the troughs in the collecting table, a device for removing the plurality of rows of brick from the collecting table simultaneously, and an intermittently movable device associated with the parallelly arranged troughs for bringing the brick in each trough into close formation for subsequent removal by said device.

10. In an apparatus for hacking bricks onto cars, the combination of a constantly movable conveyor, a vertically arranged collecting bridge associated therewith, means for delivering pallets of brick in succession to the constantly movable conveyor, a pushing device associated with the collecting bridge for pushing bricks on collected pallets from the pallets, a plurality of pairs of stop fingers pivotally mounted on the collecting bridge, operating means for the first pair of stop fingers, controlling means for said operating means operated by the bricks on the first pallet delivered to the collecting bridge, connecting means between each pair of stop fingers, whereby the operation of a pair of stop fingers will bring the succeeding pair of stop fingers into position to be engaged by the next succeeding pallet, operating means for the brick push-off device controlled by the engagement of a pallet with the predetermined pair of stop fingers, and controlling means for moving the collecting bridge vertically downward with respect to the constantly movable conveyor, said means being operable by the brick push-off device after the brick have been pushed off a collected group of pallets.

11. In an apparatus for hacking bricks onto cars, the combination of a pallet collecting device, a brick push-off device associated therewith, a collecting table associated with the pallet collecting device and adapted to receive rows of brick therefrom as delivered from the push-off device, operating means for the push-off device and the collecting table, controlling means for the push-off device and collecting table associated with the collecting table and operable to stop the operation of both the push-off device and collecting table after a predetermined number of rows of brick have been collected on the collecting table, means for removing the plurality of rows of brick from the collecting table simultaneously, and means operated by the brick removing device for restarting the push-off device and collecting table after the predetermined number of layers of brick have been removed therefrom.

12. In an apparatus for hacking bricks onto cars, the combination of a collecting device for collecting a group of pallets of brick with the pallets arranged parallel to each other and with the brick on each pallet arranged parallel with each other and lying on the flat side thereof, a collecting table associated with the collecting device and provided with a plurality of parallelly arranged troughs, said troughs being arranged transversely of the length of the collected pallets and parallel to the length of the bricks of the pallets, a brick upedging device interposed between the ends of the collected pallets and the collecting table, means for intermittently moving the collecting table step by step to bring the parallelly arranged troughs in succession into registry with the delivery end of the upedging device, means continuously operable during the intermittent movement of the collecting table for pushing the bricks off the pallets, whereby the bricks are upedged by the upedging device and delivered edgewise to the troughs in the collecting table, a device for removing the plurality of rows of brick from the collecting table simultaneously, and an intermittently movable device simultaneously operable in a plurality of said troughs for bringing the brick in each trough into close formation for subsequent removal by said device.

13. In an apparatus for hacking bricks onto cars, the combination of a collecting device for collecting a group of pallets of brick with the pallets arranged parallel to each other and with the brick on each pallet arranged parallel with each other and lying on the flat side thereof, a collecting table associated with the collecting device and provided with a plurality of parallelly arranged troughs, said troughs being arranged transversely of the length of the collected pallets and parallel to the length of the bricks on the pallets, a brick upedging device interposed between the ends of the collected pallets and the collecting table, means for intermittently moving the collecting table step by step to bring the parallelly arranged troughs in succession into registry with the delivery end of the upedging device, means continuously operable transversely of said collecting device during the intermittent movement of the collecting table for pushing the bricks off the pallets, whereby the bricks are upedged by the upedging device and delivered edgewise to the troughs in the collecting table, a device for removing the plurality of rows of brick from the collecting table simultaneously, and an intermittently movable device associated with the parallelly arranged troughs for bringing the brick in each trough into close formation for subsequent removal by said device.

In testimony whereof, I have signed my name to this specification.

CLAUD E. FULLER.

In testimony whereof, I have signed my name to this specification.

WILLIAM W. WALLACE.